(12) United States Patent
Curtiss

(10) Patent No.: US 6,545,884 B2
(45) Date of Patent: Apr. 8, 2003

(54) ALTERNATOR SYSTEM

(75) Inventor: William P. Curtiss, Chelsea, MA (US)

(73) Assignee: Ecoair Corp., Hamden, CT (US)

( * ) Notice: Subject to any disclaimer, the term of this patent is extended or adjusted under 35 U.S.C. 154(b) by 0 days.

(21) Appl. No.: 10/220,534

(22) PCT Filed: Mar. 8, 2001

(86) PCT No.: PCT/US01/07450

§ 371 (c)(1),
(2), (4) Date: Aug. 30, 2002

(87) PCT Pub. No.: WO01/67589

PCT Pub. Date: Sep. 13, 2001

(65) Prior Publication Data

US 2003/0039130 A1 Feb. 27, 2003

(51) Int. Cl.$^7$ ................................................ H02M 5/45
(52) U.S. Cl. .......................................................... 363/37
(58) Field of Search ............................... 363/37, 44, 89, 363/126; 323/282, 351

(56) References Cited

U.S. PATENT DOCUMENTS

| | | |
|---|---|---|
| 3,895,213 A | 7/1975 | Levin |
| 4,015,189 A | 3/1977 | Gorden |
| 4,117,390 A | 9/1978 | Iwata et al. |
| 4,267,433 A | 5/1981 | Sahm, III |
| 4,277,672 A | 7/1981 | Jones |
| 4,286,205 A | 8/1981 | Watrous |
| 4,673,797 A | 6/1987 | Weirick |
| 4,692,684 A | 9/1987 | Schaeffer |
| 4,950,972 A | 8/1990 | Berg |
| 4,992,672 A | 2/1991 | Norton |
| 5,070,229 A | 12/1991 | Takatsuka et al. |
| 5,072,098 A | 12/1991 | Matthews et al. |
| 5,095,222 A | 3/1992 | Pierret et al. |
| 5,166,538 A | 11/1992 | Norton |
| 5,239,255 A | 8/1993 | Schanin et al. |
| 5,793,625 A | * 8/1998 | Balogh .................... 363/89 |
| 6,031,739 A | * 2/2000 | He et al. .................. 363/44 |
| 6,075,716 A | * 6/2000 | He et al. .................. 363/44 |

OTHER PUBLICATIONS

"A New Design for Automotive Alternators", by Perreault and Caliskan Upon information and belief, this paper was publicly presented on Oct. 16, 2000.

* cited by examiner

*Primary Examiner*—Adolf Deneke Berhane
(74) *Attorney, Agent, or Firm*—Raymond A. Nuzzo

(57) ABSTRACT

An alternator system (50, 52) that, in one aspect, utilizes a Lundell style alternator that is augmented by power electronic switching components (62) in the output section. In one embodiment, some of these power switching embodiments employ a scaling of stator turns and wire size to achieve the superior performance at higher speeds. The alternator system provides significantly enhanced power capability above idle as compared with classical Lundell alternator systems using Lundell alternators of the same size that are designed with the same power capability at idle. In one preferred dual voltage embodiment, a power switch (semi-conductor) connects the alternator output directly to the low voltage load at low engine speeds and when the power switch is "opened" at higher speeds, the alternator's power is channeled to the higher voltage. In a 14-volt/42-volt dual-voltage system, this arrangement provides triple the alternator's power capability at high speeds as compared to a conventional unenhanced capabilities of the alternator system of the present invention are accomplished without increasing the alternator size or required current capacity and without using high frequency semiconductor power modulation (106).

24 Claims, 14 Drawing Sheets

ALTERNATOR SYSTEM

DESCRIPTION

1. Technical Field

The present invention generally relates to an automotive alternator system comprising an alternator having significantly enhanced power capability above idle in comparison with conventional alternators of the same size and which are designed with the same power capability of idle. The technology is particularly applicable to Lundell style alternators and dual voltage systems.

2. Related Art

Electronic valve actuation systems require only modest power at low speeds with power growing into the multiple kilowatt range at high engine speeds. One approach to providing the necessary system power at idle and the much higher valve power at high speeds is the classical Lundell Technology. A classical Lundell alternator, if optimized for the more modest power required at idle, would only lead to about 1.6 times this power at very high speeds. Even if the system is de-tuned from the optimum power at idle and is designed only to provide the required power at idle and the required power at high speed, this approach would lead to a much larger alternator exhibiting excess inertia, belt slip and difficulty of high speed operation. Such a system is not practical for providing the high power required by electronic valve actuation systems.

Typically, an electronic de-icing function for vehicle windshields requires a significant amount of power to effect rapid ice removal before the vehicle is driven. The vehicle alternator system could potentially provide this de-icing power as well as the other vehicle functions. One such state-of-the-art windshield design is the thin metallic film windshield. In order to achieve rapid ice removal for this windshield, the vehicle de-icing system would require power between about 1,200 and 1,500 watts for a 3–5 minute period. Furthermore, the de-icing system may require a relatively larger operating voltage, e.g. 42 volts to meet constraints associated with the windshield technology. The alternator system would have to provide output power sufficient to enable proper operation of the de-icing function, at the required voltage, while preferably also supplying other vehicle power functions. One possible solution to this problem of power generation is to construct conventional alternators of relatively larger size which can supply the necessary power at idle. Issues of size, inertia, high low speed torque, belt slip and required high-speed operation combine to make this a very difficult alternator design issue. Furthermore, space within the vehicle engine compartments is already at a premium.

Another possibility is to operate a conventional Lundell alternator at 2–3 times the normal idle speed during the deicing function. However a Lundell system designed to maximize power at idle would only provide a 40–50% increase in power at these elevated speeds which is still not sufficient to avoid a substantial increase in the size of the alternator. There are also power benefits through use of an initially cold alternator, but the system would still fall short and require a substantially larger alternator.

What is needed is an alternator system that is capable of providing a proportional increase in alternator power as speed increases without necessitating an increase in the physical size of the alternator.

DISCLOSURE OF THE INVENTION

Conventional Lundell (or other) style alternators are often designed for maximum power (current) at normal idle to achieve as much power as possible at their lowest operating frequency. In this condition, the alternator would be operating at maximum field current and would be delivering maximum current at the rated voltage. In such alternator configurations, maximum current would increase (at constant output voltage) as speed increase beyond normal idle, in accordance with a characteristic curve, the maximum current at double idle being about 1.4 times the idle current increasing to about 1.6 times the idle current at very high speeds. It should be noted here that a simple circuit model for an alternator phase winding consists of an AC voltage source in series with the winding impedance. The amplitude of the AC voltage source is proportional to rotor flux and machine frequency with each phase voltage differing by 120 degrees. The machine impedance per phase can be represented by an inductor in series with the winding resistance. Even at idle where the inductive impedance is lowest, the inductive impedance is typically much greater than the winding resistance. This inductive effect, even at idle, is the major contributor to current limitation in the machine. When machine speed increases at full flux, the amplitude of the internal phase voltage sources also increase proportionally with frequency but the inductive impedance also increases proportionately with frequency. Thus even though the internal voltages in the machine are very large relative to the battery, the maximum currents out of the machine are effectively limited by the constant ratio of voltage to impedance.

It has been found that if the alternator average rectified output voltage is allowed to increase linearly with speed, and it is optimally loaded, the alternator's output power can increase proportionately with speed. It has been found that an alternator, at "double" idle speed, is capable of outputting twice the power if the alternator's effective load is adjusted so that the output voltage is allowed to increase by a factor of two. As a result, the effective load resistance on the rectified alternator voltage is doubled and the alternator's average rectified output current remains constant. Thus, the output power of alternators at higher speeds can be significantly greater than the output power implied by the aforementioned characteristic curve which is based upon the alternator being constantly and effectively clamped to a fixed voltage.

Because of the higher power capability at higher speeds, dual voltage implementations are presented. Dual voltage systems allow the classic 14 volt system to be preserved while allowing higher power applications to be implemented at the higher voltage to keep system currents reasonable.

In several embodiments of the alternator system of the present invention, a Lundell style alternator is employed which is augmented by power electronic switching components in the output section. Some of these power switching embodiments may require a scaling of stator turns and wire size to achieve the superior performance at higher speeds.

The alternator system of the present invention provides significantly enhanced power capability above idle as compared with classical Lundell alternator systems using Lundell alternators of the same size that are designed with the same power capability at idle.

In one preferred dual voltage embodiment, a power switch (semi-conductor) connects the alternator output directly to the low voltage load at low engine speeds and when the power switch is "opened" at higher speeds, the alternator's power is channeled to the higher voltage. In a 14-volt/42-volt dual voltage system, this arrangement provides triple the alternator's power capability at high speeds as compared to a classic un-enhanced alternator system whose output is directed to a single output voltage. This is accomplished without increasing the alternator size or required current capacity and no high frequency semiconductor power modulation is required.

The alternator system of the present invention is particularly applicable to emerging systems with electronic valve actuation as valve power increases rapidly with vehicle speed becoming very large at high speeds. The enhanced system is also applicable to vehicles equipped with a high power electronic windshield de-icing function. In this situation, the vehicle is automatically operated at relatively high idle when the de-icing function is employed to obtain the high power required without increasing the alternators size.

The alternator system of the present invention effects optimum matching of an effective load resistance to the alternator output so as to achieve the theoretical proportional power increase capability with speed. For maximum power output performance, the alternator system effectively maintains an average rectified alternator output voltage of about 60% of the peak internal line-to-line EMF of the alternator which would vary with the speed of the alternator. Even optimized operation over a limited speed range, such as 2:1, can provide significantly more output power at the higher speed and double the alternators capability at very high speeds as compared to a non-enhanced conventional system. A fixed, controlled maximum rectified DC (direct current) alternator output current can effectively provide this maximum power for a given alternator at different operating speeds. In accordance with the present invention, the optimum matching of an effective load resistance to the alternator output, as discussed above in the foregoing description, is achieved with a power switching circuit in the output section of the alternator. Several specific examples of possible organization of these elements and their control implementations are described in the ensuring description.

The enhanced-power alternator system of the present invention can be used for effecting operation of a vehicle at a relatively faster idle when an electronic windshield de-icing function is present and activated. Specifically, the alternator system of the present invention automatically effects a relatively higher idle frequency when the vehicle is started on a very cold day and whenever the vehicle is in park, in neutral or the emergency brake is on and the windshield de-icier function is simultaneously activated.

In accordance with the present invention, the enhanced-power alternator system of the present invention generally comprises an alternator and associated electronic circuitry that is configured to produce maximum power at idle and proportionately increase power at fast idle. In a preferred embodiment, the fast idle speed is selected so that the extra power required for deicing does not require increasing the size of the alternator. Thus, the size of the alternator can be based only upon the non-de-icing power requirements at normal idle.

The electronically power-enhanced alternator system of the present invention meets the higher valve power requirements at high speed without requiring any basic alternator size increase at all. Furthermore, the alternator used in the alternator system of the present invention can operate without increased belt and pulley sizes, as maximum torque capability would remain the same if the alternator used in the alternator system of the present invention and the conventional alternator have the same maximum power capability at idle. A significant advantage of the alternator system of the present invention is that the alternator used therein can maintain the aforementioned maximum torque level at higher speeds.

The alternator system of the present invention is also applicable to other variable field alternator technologies.

BRIEF DESCRIPTION OF THE DRAWINGS

The features of the invention are believed to be novel. The figures are for illustration purposes only and are not drawn to scale. The invention itself, however, both as to organization and method of operation, may best be understood by reference to the detailed description, which follows taken in conjunction with the accompanying drawings in which.

MODE FOR CARRYING OUT THE INVENTION

In describing the preferred embodiments of the present invention, reference will be made herein to FIGS. 1–11 of the drawings in which like numerals refer to like features of the invention.

Series Switch Voltage Step-Down Configuration

Figure 1:
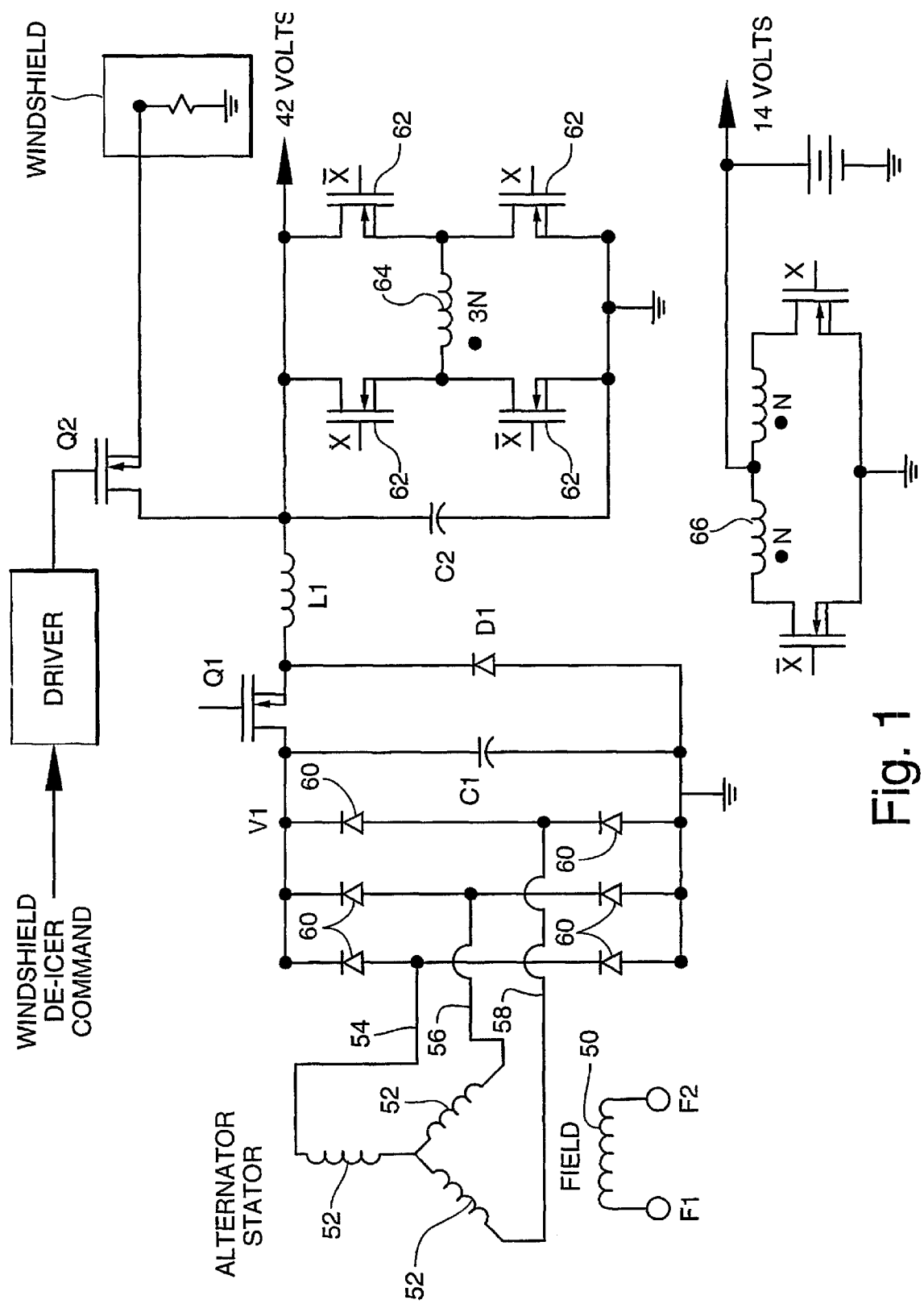
FIG. 1 is a schematic diagram of one embodiment of the alternator system of the present invention.

Referring to FIG. 1, there is shown one embodiment of the alternator system of the present invention. This particular embodiment of the alternator system of the present invention generally comprises an alternator having a rotor (not shown) with rotor field winding 50 and stator windings 52. Current is inputted into field winding 50 via inputs F1 and F2. The output of each of the stator windings 52 is outputted through output leads 54, 56 and 58. As the rotor (not shown) of the alternator rotates, a voltage is induced in the stator windings 52. This voltage is fed through output leads 54, 56 and 58 and is connected to a full wave voltage rectifier formed by six power diodes 60. Such a full wave voltage rectifier configuration is well known in the art. In order to facilitate understanding of this embodiment of the present invention (shown in FIG. 1), the ensuing description is in terms of rotor field winding 50 being fully excited by 14 volts and the alternator system being is heavily loaded. Transistor Q1 functions as a series switch. In one embodiment, transistors Q1 is a FET (field-effect transistor). The DC alternator bridge voltage V1 increases with speed when transistors Q1 is "ON" until voltage V1 becomes approximately 42 volts. In accordance with the present invention, V1 becomes approximately 42 volts at normal vehicle idle speed.

Referring to FIG. 1, the alternator system further comprises an "H"-bridge inverter which formed by four FETS 62 and a step-down transformer that has primary winding 64 and secondary winding 66. The step down transformer has a 3:1 ratio. The "H" bridge inverter is a high efficiency, intermediate-frequency, square-wave inverter whose secondary winding 66, through active rectification, provides a nominal 14 volts DC. Until voltage V1 becomes 42 volts, transistor Q1 remains fully "ON" and current flows through transistor Q1 to provide approximately 42 volts at the top of the "H" bridge inverter. Since the "H" bridge is hi-efficiency with low rectification losses by design, the alternator system acts to transfer power between 42 volts and 14 volts in an efficient bilateral fashion. Appropriately phased, complementary drive signals for the bridge and active rectifier assembly are indicated by the letters X and $\overline{X}$ shown in FIG. 1. The only battery in the system is the 14 volt battery so that voltage is precisely regulated by the system, as described in the ensuring description, to maintain proper battery performance. The 42 volts is indirectly quasi-regulated due to the fixed transformation ratio and low loss of the DC/DC converter design. The standard series switching regulator configuration of C1, Q1, D1, L1 and C2 takes effect as the alternator speed increases. Transistor Q1 goes into a switching mode of operation as the 42 volts, transformed to the battery by the "H" bridge inverter, reaches the desired 14 volts thereby allowing buss voltage V1 to increase with speed. This feature is what allows the alternator's power to increase proportionately with speed. In a preferred embodiment, transistor Q1 is operated so as to regulate 14 volts and the field winding 50 is controlled to limit the maximum bridge voltage so that system voltages are minimized after the desired increase of power with speed is achieved. The circuit configurations used to control field 50 are discussed in detail in the ensuing description. FIG. 1 also illustrates the windshield de-icier power enable and the fast idle command logic as discussed previously herein. Although the voltage loads are not shown in FIG. 1, it is to be understood that at vehicle start-up, the bilateral nature of the 42 to 14 volt converter allows the single battery to supply the lower power valve power required to start the engine and supply power to 42 volts until the vehicle comes up to idle.

A Basic Control Loop for the Series Mode Step Down Switching Regulator

Figure 2:
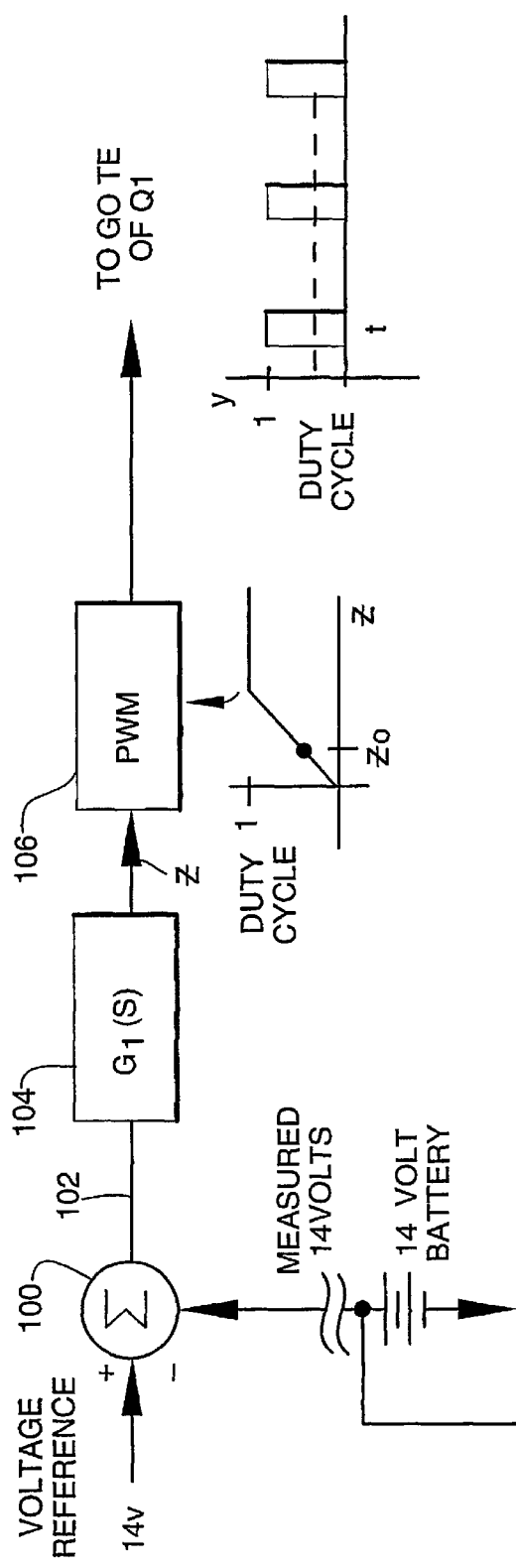
FIG. 2 is a block diagram of one embodiment of a control loop configuration for use with a series voltage step-down switching system shown in FIG. 1.
Figure 2:
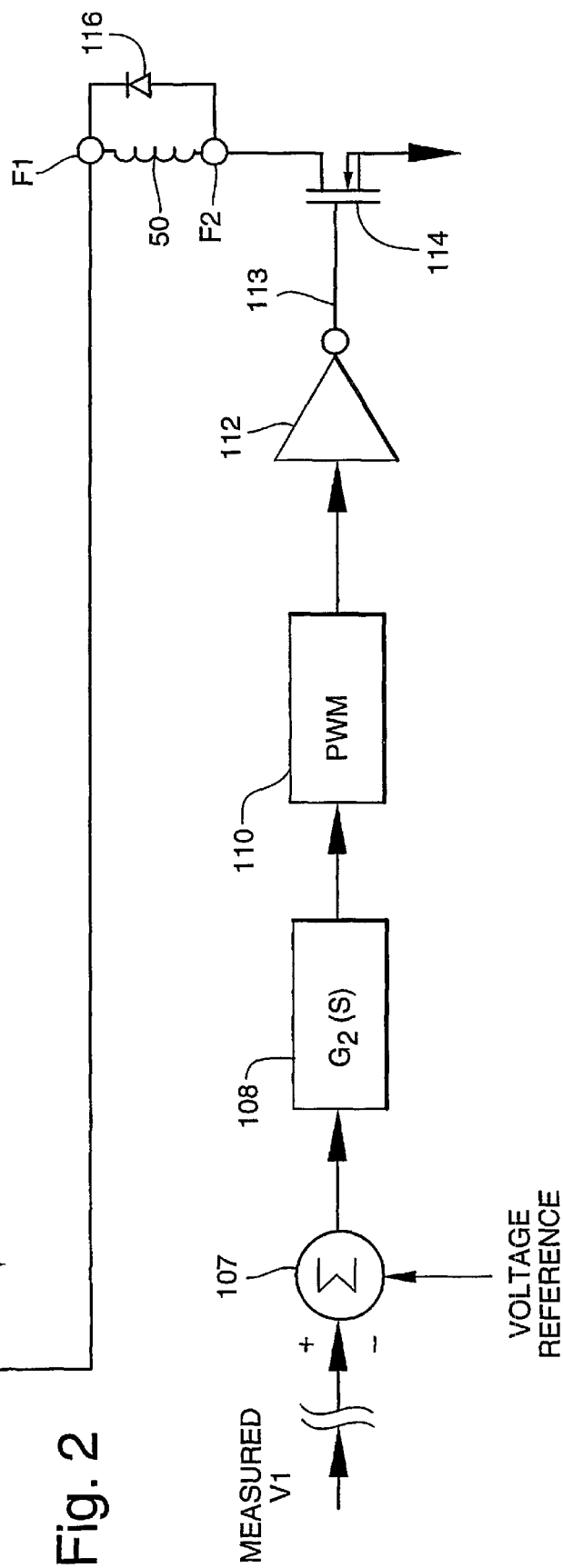

In accordance with the present invention, the transistor Q1 (see FIG. 1) is driven by a control circuit that enables the bridge voltage V1 to increase as the alternator speed increases. Such a configuration is a significant feature of the alternator system of the present invention which effects significant improvements in the alternator power capability at higher speeds. FIG. 2 illustrates a control circuit for driving the gate of transistor Q1. The actual 14 volt output and an equivalent 14 volt reference is inputted into network 100 that outputs a scaled difference signal 102. Signal 102 is inputted into gain circuit $G_1(s)$, indicated by numeral 104, which provides amplification and frequency compensation. The output of gain circuit 104 (indicated by Z) is inputted into pulse width modulator (PWM) circuit 106. In response, PWM circuit 106 excites the gate of the series-switching transistor Q1 shown in FIG. 1. The closed loop formed by this circuit configuration adjusts the switch duty cycle so that 14 volts is precisely regulated independent of the bridge voltage from idle up to top speed.

The control circuit of FIG. 2 includes a flux control loop that improves performance and lower the costs of the alternator system. This flux loop is configured to limit or "clamp" the bridge voltage to a reference voltage. As shown in FIG. 2, the measured bridge output voltage V1 and the desired maximum "clamp" voltage are inputted into network 107 which outputs a difference signal. The difference signal is inputted into gain circuit $G_2(s)$, indicated by numeral 108, which amplifiers and provides frequency compensation to the difference signal. The output of gain circuit 108 is inputted into PWM circuit 110. The output of PWM circuit 110 is inputted into inverter circuit 112. Inverter circuit 112 outputs a control signal 113 that is inputted into the gate of transistor 114. Transistor 114 functions as the control for field winding 50. Field inductance clamp diode 116 is connected across inputs F1 and F2. If 14 volts is utilized as the field power supply, the field inductance clamp diode 116 can be returned to 42 volts, if desired, to improve response times to over voltage transients.

If the field voltage at field 50 were held fixed at full value, the bridge voltage would become excessive at high speeds especially at light loads. This is because the high alternator speed can be over ten times the idle speed leading to V1 voltages of 10–20 times the 42 volt output. If, for example, it is necessary to realize improvement by a factor of three in high-speed power (current) over a standard alternator of the same size, the flux loop of FIG. 2 can be used to limit the bridge voltage to 3 times the 42 volts so as to achieve this required performance improvement.

Overload Protection for the Series Mode Switching Regulator

The Series Switching Regulator of FIG. 1 and the control described for it in FIG. 2 can exhibit degraded performance in a system power overload situation. This problem can be readily avoided through understanding of the basic mechanism. To illustrate, assume operation at idle speed under full load with the alternator putting out 42 volts and with Q1 just starting to modulate "off". The flux would be at maximum. If the system is loaded beyond its full power capability, the 14 and 42-volt outputs would drop in value and Q1 would be forced full on. If the effective load resistance is made still lower to draw more current, the alternator output current will continue higher and approach it's short circuit value while the voltages go well below their regulated values including the Voltage V1. If the alternator speed is increased further with potentially even lower resistive loads, the voltage V1 may not increase enough to allow Q1 to start modulating. This is because the basic alternator windings are already providing nearly their maximum currents, which will not increase much further even at very high speeds. The system is thus in a latch type situation where the basic output voltages never reach regulation. In this situation, Q1 never modulates "off" so the alternator's average rectified voltage is not able to realize the proportional increase in voltage and power that should be available. The basic problem is that the characteristic, fixed, maximum power value of the DC current being drawn from the alternator's bridge rectifier assembly is being exceeded.

Thus, in accordance with the present invention, the alternator system of the present invention utilizes overload protection circuitry for the series switching regulator in a system power-overload situation. In one embodiment, the overload protection circuitry comprises circuitry to measure the actual average bridge current. Preferably, the average bridge current is measured before capacitor C1. The overload protection circuitry further includes a circuit for generating an error signal when the current in the bridge begins to exceeds a preset value (the fixed optimum power value). The error signal is summed into the input of a pulse width modulator that drives transistor Q1. The pulse width modulator has a polarity such that the modulator would begin to turn transistor Q1 "off". This would have the effect of limiting bridge current. By limiting the average bridge current to just beyond the optimum power point current, the system outputs almost all the power it is capable of producing at the existing operating speed. If the system loading is severe that the 14-volt field voltage is further diminished, the alternator's maximum power capability is further diminished. By scaling the current limit to the reduced 14 volts, the system can continue to generate the maximum power possible at this reduced flux. As speed further increases, the power at this fixed current will increase proportionately with speed and the latch-up condition can be avoided. Addition of a current limit circuit can maximize the output power of the system under overload conditions when the 14 volts would is less than its normal regulated value.

In one embodiment, the circuitry that measures the current comprises a current-sense resistor on the ground side between the capacitor C1 and the negative side of the rectifier assembly. Such a configuration would require that the ground side of the lower rectifier assembly be isolated from the grounded alternator case.

The overload protection circuitry described in the foregoing description is just one example. Other suitable circuit configurations are possible.

Figure 3:
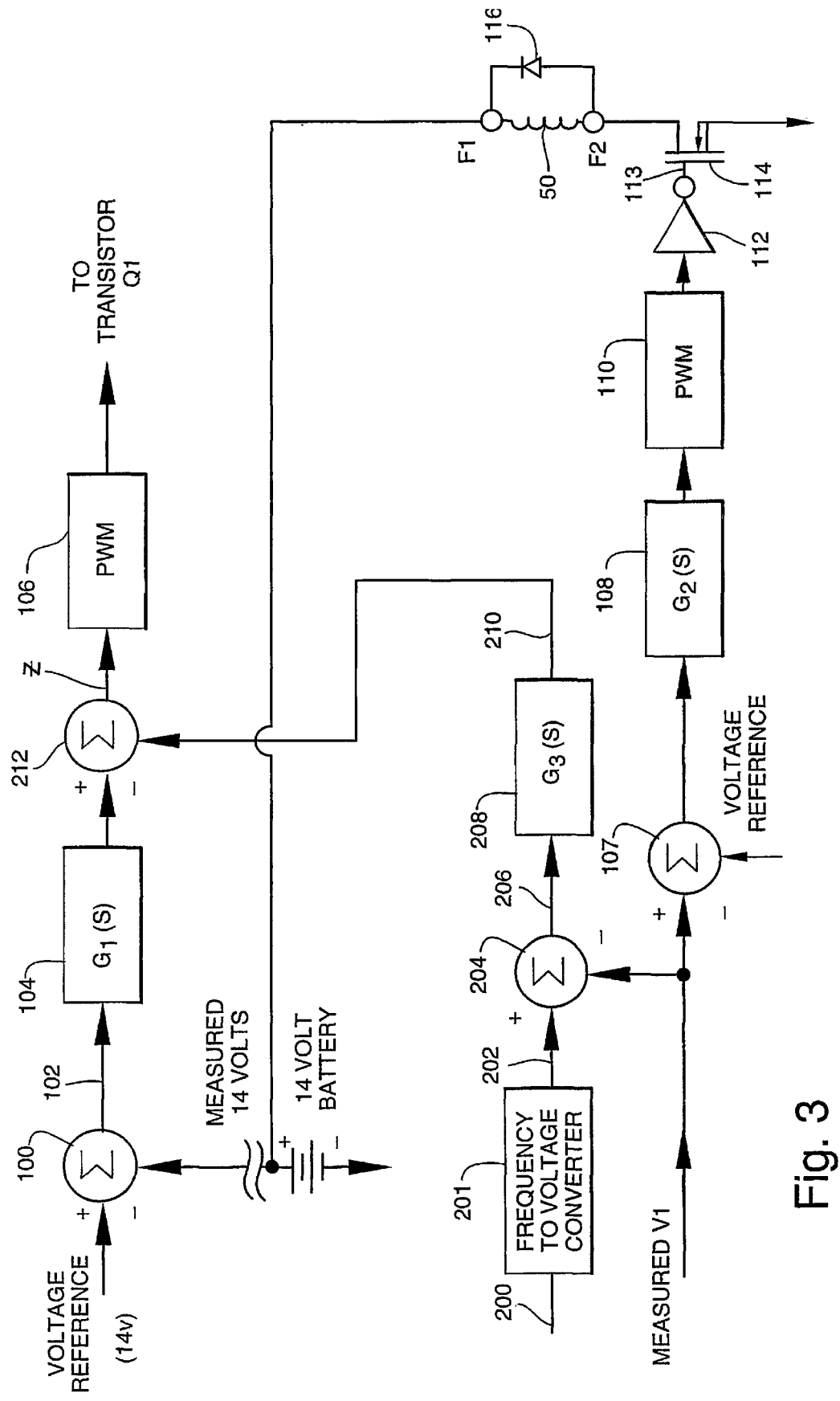
FIG. 3 is block diagram of another embodiment of a control loop configuration for use with the series voltage step-down switching system shown in FIG. 1.
Figure 4:
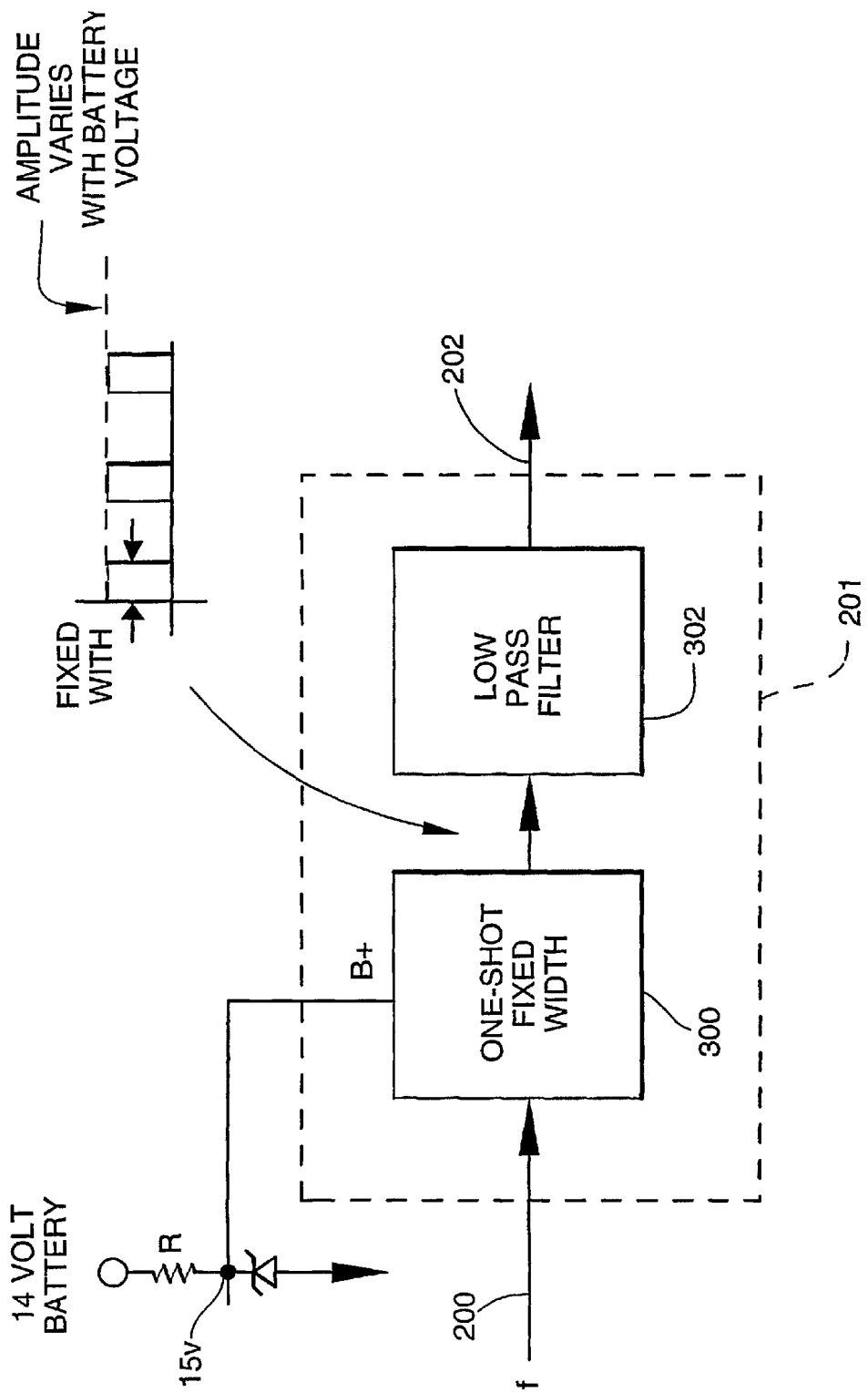
FIG. 4 is a block diagram of a frequency-to-voltage converter shown in FIG. 3.

Referring to FIG. 3, there is shown an alternate control circuit for use with the series switching scheme of FIG. 1 that solves the power overload problem. This alternate control circuit does not require a direct or indirect current measurement. This implementation is based upon the principal that the optimally loaded alternator voltage V1 increases proportionately with speed. In this implementation, an electrical input frequency 200 (described in the ensuing description) representative of the alternator speed is converted by a frequency-to-voltage converter 201 to form a DC voltage signal 202 that is representative of alternator speed. Signal 202, when appropriately scaled, represents the desired optimum power value of V1 as a function of speed. Signal 202 and the measured V1 are inputted to network 204. Network 204 outputs a difference signal 206 that is inputted into gain circuit $G_3(s)$, indicated by numeral 208, which provides gain and frequency compensation. Gain circuit 208 outputs signal 210 that is inputted into network 212 wherein it is summed with the proper polarity and then inputted into the PWM circuit 106 (discussed in foregoing description and shown in FIG. 2) that controls transistor Q1. Such a configuration reduces the duty cycle of transistor Q1 when the bridge voltage is less than the desired voltage V1. Thus, the current load on the bridge is reduced so that the desired optimum V1 is maintained thereby producing the maximum alternator output power available. It is important that circuit saturation levels are set so the output of gain circuit 104 has adequate range to fully control PWM 106 when gain circuit 208 is saturated negative and loses all control before gain circuit 106 saturates positive. When V1 reaches the desired clamp voltage level as described in the foregoing description, the flux loop takes over so that V1 is limited. It is important to limit the maximum frequency-to-voltage converter's output voltage, the desired V1, to a value somewhat below the V1 clamp value set for the bridge. This is necessary to avoid having this otherwise increasing signal begin to shut off transistor Q1 when it goes above the clamped V1. The function of limiting V1 can be accomplished by choosing an appropriate gain in the output section of the frequency-to-voltage converter so that circuit saturation can automatically limit V1. Limiting V1 effectively keeps gain circuit 208 from being excited when field control takes effect for limiting the bridge voltage. The flux loop shown in FIG. 3 is generally the same as the flux loop shown in FIG. 2. When the system is in an overload situation, the field command will always go to full "on". However, the actual voltage utilized to drive the field winding to maximum ampere-turns will be the degraded battery voltage. The lowered ampere-turns on the field winding will proportionately lower the optimum power V1 at any speed. FIG. 4 is a block diagram of frequency-to-voltage converter 201. Frequency-to-voltage converter 201 generally comprises a fixed-width pulse width generator 300 is configured so its triggering function is based upon the input frequency rate. The amplitude of the fixed-width pulse is made proportional to the battery's actual voltage. Thus, the scale factor of the frequency-to-voltage converter 201 is proportionately changed so that the derived optimum V1 includes the overload effect. The output of fixed-width pulse generator 300 is inputted into low pass filter ("LPF") 302. Low pass filter 302 outputs filtered pulses 304. The average output of filtered pulses 304 represents the new optimum desired V1 when the 14 volt battery voltage is under voltage.

If the feature illustrated in FIG. 4 is incorporated into FIG. 3, the resultant control loop for the series switch configuration of FIG. 1 will make that configuration very robust and will eliminate the latch-up condition discussed in the foregoing description. Furthermore, the aforementioned resultant control loop will maximize the power available from the alternator system at any speed including conditions of overload. This maximization thus achieves the highest output voltages possible in an overload situation.

As stated in the foregoing discussion, the circuit configuration of FIG. 3 requires a frequency proportional to the alternator's speed. A frequency proportional to the alternator's speed is readily attainable by several means without adding a specific sensor. For example, zero crossing transitions from one or all of the three-phase voltage signals on output leads 54, 56 and 58 (see FIG. 1) with respect to a voltage equal to one-half the battery voltage can be easily measured. Commercially available integrated circuits are available for this function and provide a frequency of six times the fundamental frequency on a phase winding. Alternately, the voltages on output leads 54, 56 and 58 all go negative with respect to ground once per cycle of a phase signal because of the current in power diodes 60. Comparator circuits in conjunction with attenuators or clamps on their inputs can sense negative or positive transitions for each of the voltage signals on output leads 54, 56 and 58 to yield a net frequency up to three times the phase frequency.

Shunt Switch Arrangement for Enhanced Alternator System

Figure 5:
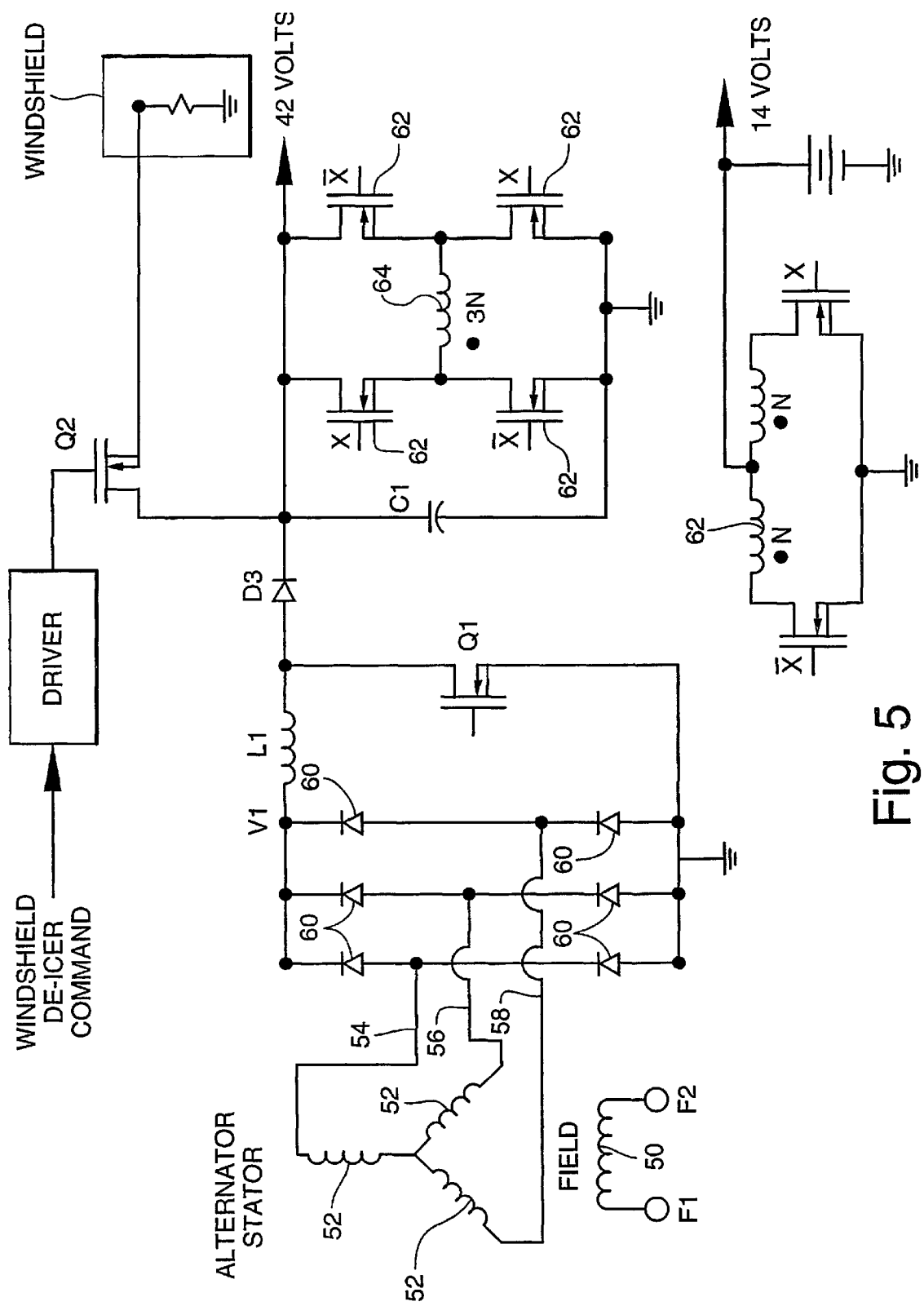
FIG. 5 is a schematic diagram of another embodiment of the alternator system of the present invention that utilizes a shunt-switching configuration.

Referring to FIG. 5, there is shown another embodiment of the alternator system of the present invention. This alternator system comprises a voltage boost mode switching circuit that allows the average rectified alternator voltage represented by V1, to increase with speed. When transistor Q1 is closed, the current flowing through inductor L1 increases. When transistor Q1 is open, the current flowing through inductor L1 flows into a nominally fixed but higher secondary voltage which may be a battery or a battery reflected through an inverter or a large capacitor or combination thereof as shown. When transistor Q1 is "off", the current flowing through inductor L1 diminishes with time. This switching circuit allows the alternator average output voltage V1 to vary proportional to speed over a limited range with the appropriate average DC current automatically being supplied to the output through the inductor L1 during the switch "off" intervals. As discussed in the foregoing description, the operational characteristic of effecting a proportional voltage increase with speed allows a proportional increase in power for the alternator system. When the average optimized voltage V1 reaches the desired output DC voltage, transistor Q1 could remain "off" and alternator operation would revert to that of a conventional alternator with voltage control handled by field control alone. Feedback from the 14-volt output, when summed with a reference voltage to produce a difference signal is used to control field 50 and transistor Q1. A detailed description of one applicable control mechanism is described in the ensuing description.

Basic Control Loops for the Shunt Switching Regulator Configuration

Figure 6:
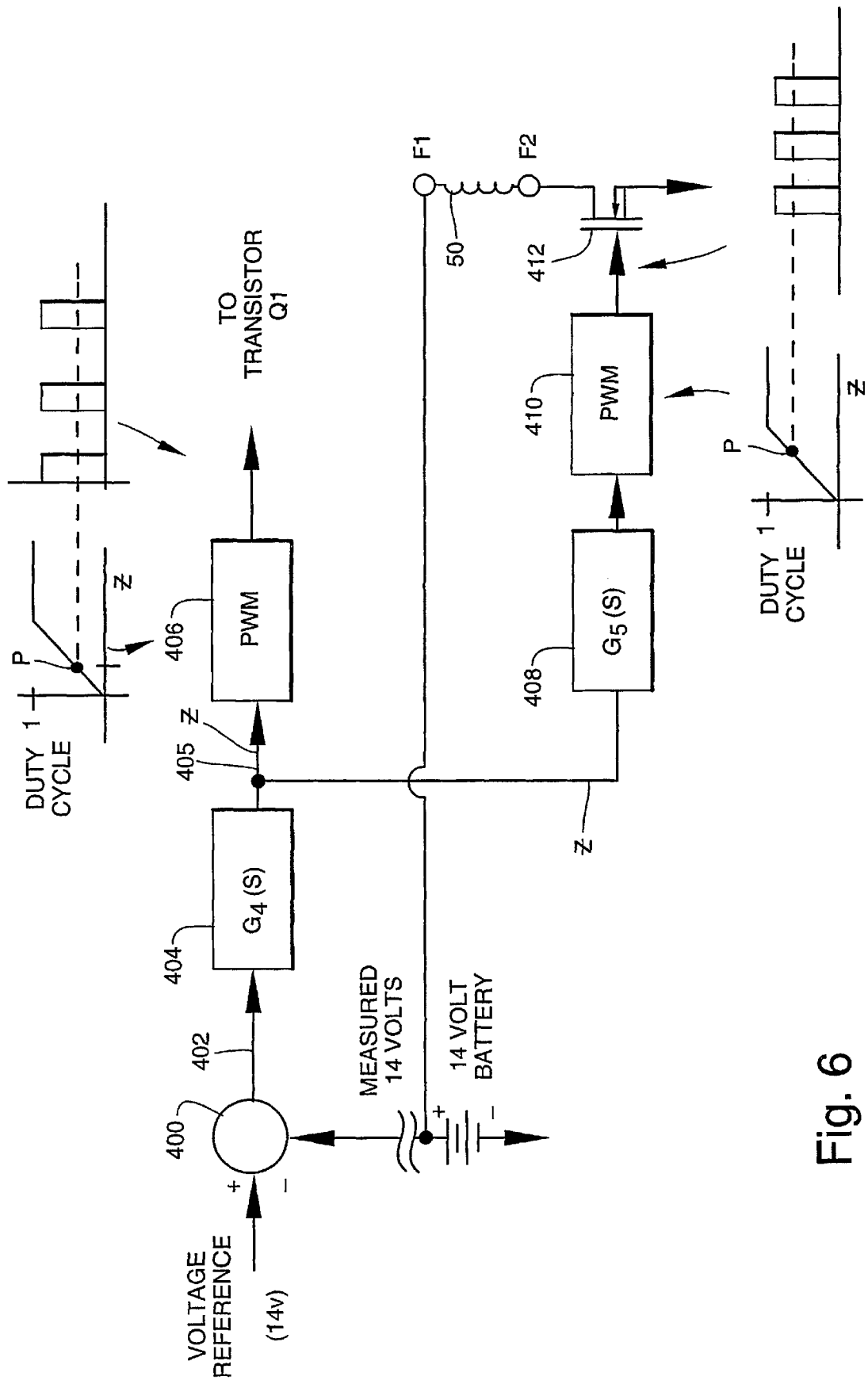
FIG. 6 is a block diagram of a closed-loop control loop configuration for use with the shunt switching configuration shown in FIG. 5.

As in the Series Mode step-down Switching Regulator, the basic principal of allowing the equivalent basic average bridge output voltage to increase with speed is the essence of the alternator system of the present invention which exhibits relatively improved alternator power capability as speed increases. FIG. 6 shows a direct-control circuit configuration that enables the equivalent basic average bridge output voltage to increase with speed. The circuit configuration shown in FIG. 6 exhibits the same control configuration as used in the series switching regulator configurations of FIG. 2 and FIG. 3. The circuit configuration shown in FIG. 6 may be used with the alternator system shown in FIG. 5. As shown in FIG. 6, the voltage reference and the measured 14 volts are inputted into network 400 which outputs a difference or error signal 402. Difference signal 402 is inputted into gain circuit $G_4(s)$, indicated by numeral 404 which provides gain and frequency compensation. The output of gain circuit 404 is inputted into PWM circuit 406 which in turn drives the shunt regulator's power switching device, i.e. the gate of transistor Q1 shown in FIG. 5.

The control circuit shown in FIG. 6 further includes a flux control loop that functions to maintain the average bridge output voltage somewhat less than the 42-volt system output voltage depicted in FIG. 5. The purpose for such a configuration is to maintain the shunt-switching regulator nominally in an active non-saturated condition so it can maintain precise control of the 14 volts. The analog voltage outputted by gain circuit 404, indicated by the letter Z, is inputted gain circuit $G_5(s)$, indicated by numeral 408. The magnitude of analog voltage Z represents the duty cycle on the shunt switching device. Thus, the magnitude of the analog voltage Z represents how near the switching regulator is to full "off" operation. Gain circuit 408 provides analog voltage Z with added gain and frequency compensation. The output of gain circuit 408 is inputted into PWM circuit 410. In response, PWM 410 drives the gate of transistor switch 412 which provides control of field 50. As the duty cycle approaches zero, the field voltage modulator begins to reduce the average voltage on field 50 resulting in an operating point at less that 100% duty cycle. A possible operating point during flux reduction is indicated by the letter P in the duty cycle vs. voltage graph shown in FIG. 6. The field reduction zone is not entered until the shunt switch modulators input voltage Z is at a low level indicating a low shunt switch "on" duty cycle. Field control becomes an essential aspect of the control loop when the speed is above the region where the system can increase power proportionately with speed. For example, if the system is designed to provide three times the power of an a similarly sized but non-enhanced alternator at high speeds, at full flux and full load, this alternator would create 42 volts at three times idle speed in the configuration of FIG. 5. Any reduced loads or higher speeds would cause over-voltage in the system unless the field is reduced.

Overload Protection in the Shunt Switching System

In the shunt switching configurations illustrated in FIG. 5 and using the control algorithms presented in FIG. 6, the overload performance is not optimized. In order to facilitate understanding of the ensuing aspect of the present invention, it is assumed that the system of FIG. 5 operating at idle and the system load is gradually increased. The DC current in inductor L, neglecting ripple, increases with output dc load. At idle and modest load, the DC current in inductor L would always be bigger than the load current because of the step up in voltage and corresponding step down in current that the boost configuration provides. As the load current increases, the DC current (neglecting ripple) in the inductor would also increase. Note that this DC inductor current is also the load DC current on the main alternator DC-bridge. As discussed previously, as this current continues to increase, there is a maximum power point at which further increases in DC current from the bridge would cause a decrease in overall output power. Thus if the system is loaded by a still lower value of resistance, the actual output power would diminish further because the basic alternator bridge would be operating further beyond its maximum power point. The regulated output voltage would also drop in this condition and this would lead to less voltage driving the alternator field. This would lead to fewer ampere-turns in the field that would reduce the optimum DC Bridge current and the available output power even further.

In accordance with the present invention, overload protection can be achieved in the system of FIG. 5 by incorporating a current limiting circuit in the shunt switch. Typical commercially available driver integrated circuits or chips incorporate an "inhibit on over-current" function with renewed operation on the next cycle of the PWM signal. Since the bridge current and the shunt switch current are the same signals when the shunt switch is "on", it is very practical and feasible to introduce the current limit at this point. This current limit is set at slightly above the ideal maximum power current of the bridge as previously discussed. If this system is overloaded, the 14 volts would fall out of regulation and the loops previously described (see FIG. 6) would command the field voltage full "on". However, the decreased 14 volts would tend to reduce the field ampere-turns which would lower the ideal maximum power current of the bridge. If the current limit is reduced proportionately as the 14 volts drops, the system would continue to operate at its most optimum power level and thus provide all the output power that is available. This current limiting configuration functions in the same manner and provides the same results for all speeds of operation when the shunt semiconductor switch Q1 is boosting voltage.

Figure 6A:
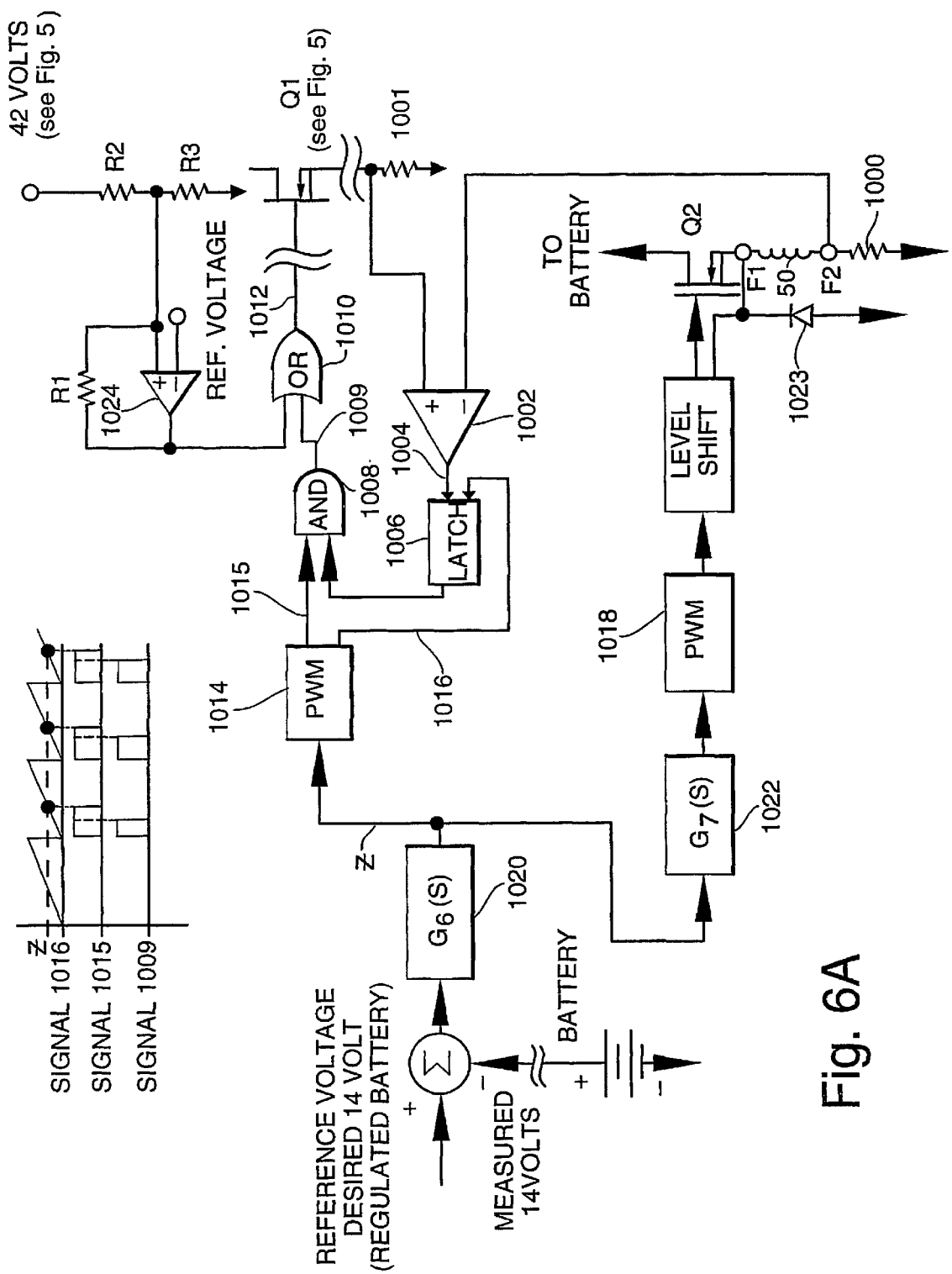
FIG. 6A is a block diagram of an alternate embodiment of the configuration shown in FIG. 6.

The maximum field current can also vary strongly with temperature. This comes about because of the large changes in operating temperature of the field winding 50 as a result of alternator operating conditions. FIG. 6A illustrates a modification of the control loop illustrated in FIG. 6 which includes the current limiting functions discussed above and also varies the current limiting based upon a direct measurement of the amp-turns in the field winding 50. This improvement takes account of both reduced 14-volt battery conditions and winding resistance variations with temperature. Combined, these effects could have more than a 2:1 effect on optimum bridge loading current for maximum power. The operation of the system shown in FIG. 6A is now described in the ensuing description.

Referring to FIG. 6A, sense resistor 1000 senses the actual field current in the alternator. To make this measurement easy and continuous, the PWM excitation for the field winding was changed to a topside switch arrangement. The voltage across this sense resistor 1000 thus measures the ampere-turns in the field winding 50. This field current through a fixed scaling is directly proportional to the optimized alternator bridge DC loading current. The field current measurement thus represents the current limit point for the DC bridge current load. An instantaneous measurement of bridge current occurs when transistor Q1 (also shown in FIG. 5) turns on and the sense resistor 1001 measures this current. When the current is shunt power transistor switch Q1 reaches this set current, comparator 1002 output signal 1004 that sets a latch circuit 1006 to make a logic "0" on its Q output. This latch output in turn forces the "AND" gate 1008 to output signal 1009 that has a logic "0" level. Signal 1009 is inputted into "OR" gate 1010. In response, "OR" gate 1010 outputs signal 1012 that turns "off" power transistor switch Q1, assuming that the other input to "OR" gate 1010 is at a logic "0" level. PWM circuit 1014 outputs a "saw tooth" signal 1016 that has a negative going edge that resets the Q output of latch 1006 to a logic "1" state which allows the "AND" gate 1008 to restore control to PWM circuit 1014 to start another cycle of operation. PWM circuit 1014 also outputs signal 1015 that is inputted into "AND" gate 1008. In effect, this current limit mode of operation operates cycle by cycle and acts to shorten the "on" time the actual PWM circuit would be commanding if the limiting were not present. The wave forms shown on FIG. 6A show the PWM "saw-tooth" reference and output signals and illustrate the timing of the latch reset and how the limiting effects the PWM duty cycle.

It is important to consider how the circuit performs as field control comes into play. As speed increases for the shunt mode switching regulator, under less than maximum power conditions, the field must be reduced to avoid an over voltage situation. The circuit does this by reducing the field excitation voltage. For example, if the system is loaded for maximum power within the zone wherein 14 volts is regulated and the duty cycle on Q1 is approaching zero, and if the load current is held fixed and the speed increases significantly, the system output voltage would tend to increase relative to the reference causing the duty cycle on Q1 to further decrease but not go to zero because a signal Z is still required to drive PWM circuit 1018 to reduce the field average voltage (current). The duty cycle on transistor Q1 would thus reduce but would stay finite even if speed doubled. The reduced current in the field current sense resistor would thus reduce the voltage on the comparator that is setting the current limit on transistor Q1. The PWM circuit 1014 would thus turn on transistor Q1 but since the real load current is higher than the maximum value set by the field current, transistor Q1 would turn back "off" immediately as the latch inhibits the signal outputted by PWM circuit 1014. In this mode of operation, transistor Q1 is effectively "off" and battery voltage control is solely through the field control loop acting through gain circuits 1020 and 1022 and PWM circuit 1018. The bridge current could be continuously sensed by utilizing a current resistor in the ground return of the bridge between the lower bridge rectifiers and the low side of transistor Q1 similar to the location described previously in the series mode switching circuit configuration. The sense resistor in its new location would create a negative voltage relative to the battery ground (vehicle ground). The battery ground is the ground symbol referred to in FIG. 6A. An inversion of this signal would replace the current sense input signals shown in of FIG. 6A. If this continuous bridge current sensing scheme is utilized, the sense resistor sensing "on" current in transistor Q1 of FIG. 6A is not required. Catch diode 1023 is connected between F1 of winding 50 and ground.

To review loop performance, at low speeds where the boost function is active, this control loop always maximizes the field current that in turn minimizes the bridge DC current for equal power output. This is important to reduce stator copper losses and to minimize power diode losses. Although the field power may be 50–60 watts, the power in the alternator rectifier diodes at maximum load current at idle speed would typically be many times greater than 60 watts. Also the stator winding losses would also be much greater than 60 watts. To minimize overall circuit losses, it is preferable to keep the field power maximized until an incremental reduction in field power saves more power than the equivalent extra losses that the equivalent increased stator currents would create. Reducing field power would only save overall power at lower alternator power outputs.

Alternators systems tend to produce a serious over voltage condition if the system is operating at full load and all loads including batteries are suddenly removed. The main cause is that if the alternator field is fully excited and if loads are removed, the alternator's output voltage would go to very high voltages until the field can be reduced. Typically, the field time constant is on the order of 100 milli-seconds and considerable damage can occur if this voltage is not suppressed. A circuit for suppressing this signal is also shown in FIG. 6A. Comparator 1024 is configured to output a logic "1" signal if 42 volts reaches 58 volts. Resistor R1 is utilized to provide positive feedback, which introduces hysteresis to the threshold switch points. Through proper selection of the resistors R1, R2 and R3, the comparator can be made to switch "ON" if the desired 42 volts exceeds 58 volts and then turn "off" again when the voltage drops below a threshold, e.g., 45 volts. When output of comparator 1024 is high, its output would turn transistor Q1 "ON" via the "OR" gate 1010. This signal will short out the alternator thereby suppressing all power transfer to capacitor C1 (FIG. 5) on the 42 volt output until the voltage decays to a particular threshold, e.g. 45 volts. At that point, the transistor switch Q1 turns "OFF" and the voltage on C1 (shown in FIG. 5) starts to increase again if the machine field has not decayed enough. Transistor Q1 essentially goes into an oscillation cycle such that the 42 volts slews back and forth between 58 and 45 volts until the field has decayed enough so that 58 volts is not reached. The output voltage being high would make the voltage higher than 14 volts on the secondary side of the DC/DC converter illustrated in FIG. 5. This "hi" condition on 14 volts would force the signal Z (see FIG. 6A) to zero which would act to turn "off" the field voltage until 14 volts can come back into regulation.

In summary, the control loop configuration illustrated in FIG. 6A exhibits very robust performance even in overloaded situations. In the region from idle speed to speeds where voltage boost is no longer required, the system maximizes the available power from the machine which in turn would maximize output voltages when the system is overloaded. This includes effects caused by reduced battery voltage under overload operating conditions and optimum performance as field winding resistance varies with temperature. The system also operates to maximize flux to minimize stator copper and power diode losses. The configuration also easily provides excellent clamp voltage protection for the classic "load dump" situation with very little extra control circuitry. The shunt power switch Q1 is modulated so as to limit the transient over voltage with the control technique described above. Thus, the clamp-type diode suppressers in common use today are no longer needed.

Figure 7:
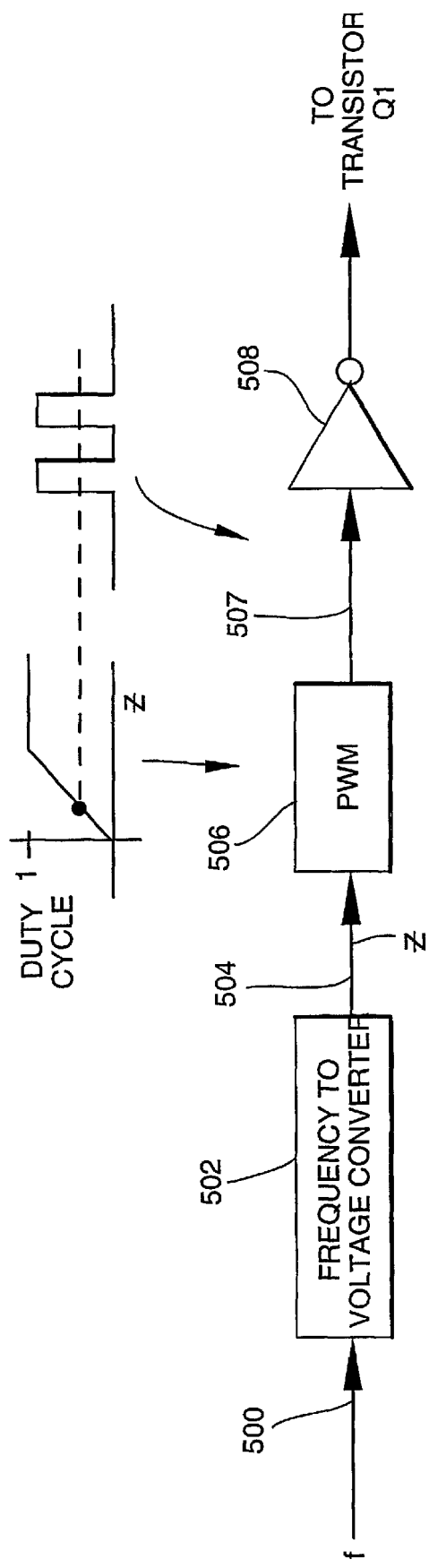
FIG. 7 is a block diagram of a quasi open-loop configuration for use with the shunt switching circuit configuration shown in FIG. 5.

FIG. 7 shows an alternate open-loop control scheme applicable to the shunt switching regulator configurations shown in FIG. 5. In this implementation, an electrical input frequency 500 representative of the alternator second is converted by a frequency-to-voltage converter 502 to provide a DC signal 504 representative of alternator speed. The magnitude of signal 504 is indicated by the letter Z. A frequency proportional to the alternator's speed is obtainable without the need for auxiliary sensors by monitoring one or more of the bridge phase voltages and detecting negative (or positive) transitions with respect to ground. The shunt-switching device, while modulating, shorts out the bridge and its phase voltages. Current, however, keep flowing in the lower bridge diodes due to the load current so there is a strong negative signal of at least 0.5 volts every cycle in these diodes independent of whether the bridge is shorted or not. Signal 504 is inputted into PWM 506. In response, PWM 506 outputs signal 507 which is inputted into inverter 508. The output of inverter 508 drives the gate of transistor Q1 shown in FIG. 5. The scale factor of the frequency-to-voltage converter 502 is selected such that PWM circuit 502 reaches 100% duty cycle when the alternator system of FIG. 5, at maximum flux excitation and with an optimum power load, would just provide 42 volts. The open-loop generated signal 507 versus frequency is a close approximation of the output of PWM circuit 506 that would occur in FIG. 6 or FIG. 6A for driving the same transistor switch Q1 as long as the system loads are at maximum power at each frequency. In the implementation of FIG. 7, the flux loop could employ a standard alternator voltage regulator where the regulators power source is 14 volts. The regulator would vary the field current so as to hold 14 volts regulated via the intermediary voltage of 42 volts. As mentioned before, the 42/14 volt step down converter is very efficient. This implies that 42 volts is also reasonably regulated even though 14 volts is the targeted voltage for precise regulation. In this loop configuration, the field control system maintains regulation of the 14-volt output voltage from idle to maximum speed while the shunt power semiconductor switch Q1 acts as an intermediary voltage level shifting mechanism to allow the alternator voltage to increase with speed.

This quasi open loop control configuration discussed above is quite simple but as drawn it does not contain some of the benefits outlined in 6A above. As shown it does not modify the duty cycle so as to optimize performance when field strength is reduced such as when in an overload situation or when field current changes with temperature. It also does not operate the machine at maximum flux at lower speeds when load currents are medium to high. This creates a system with somewhat higher overall losses at medium to high power as compared to a system that maximizes flux as does the configuration illustrated in 6A. Some of these features can be added but a preferred embodiment would appear to be a more closed loop approach with current control as outlined in FIG. 6A.

Figure 7A:
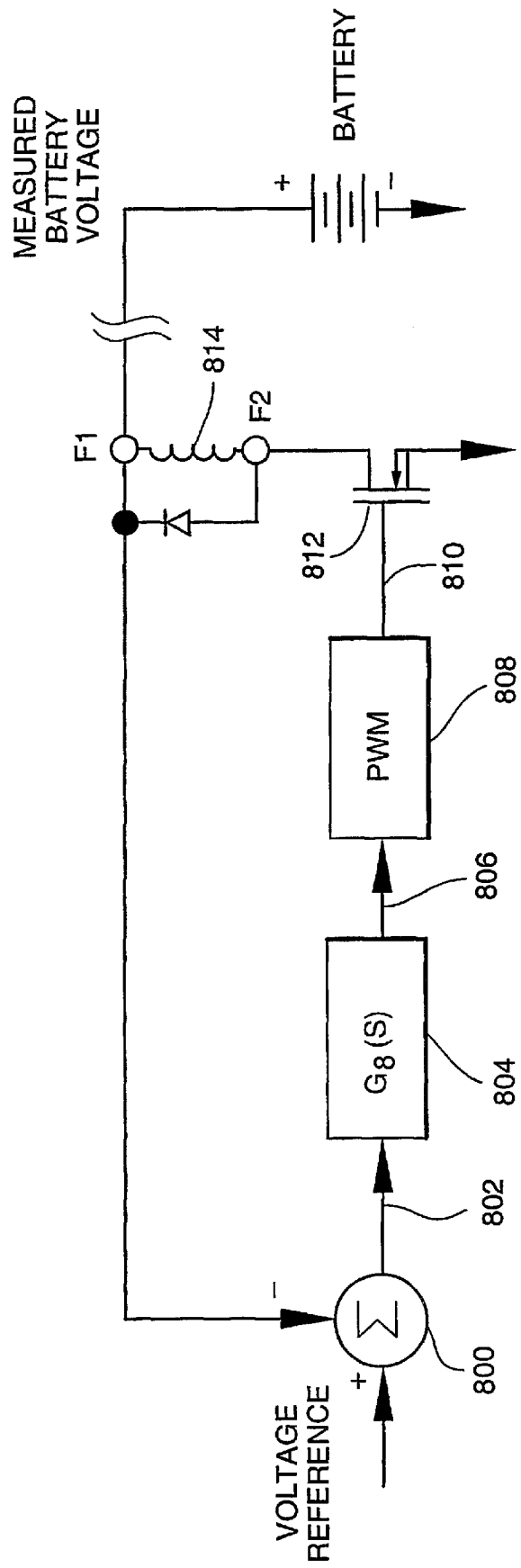
FIG. 7A is a block diagram of a conventional flux control scheme.

In order to facilitate understanding of the present invention, a classical conventional flux control scheme is shown in FIG. 7A. A reference voltage and the battery voltage are inputted into a network 800 that outputs an error signal 802. Error signal 802 is inputted into gain circuit 804 which provides gain and compensation. Gain circuit 804 outputs amplified signal 806 which is inputted into PWM circuit 808. PWM circuit 808 outputs control signal 810 that is applied to the gate of transistor 812. As a result, the current flowing through rotor field winding 814 provides adequate flux to create the proper output voltage.

Figure 8:
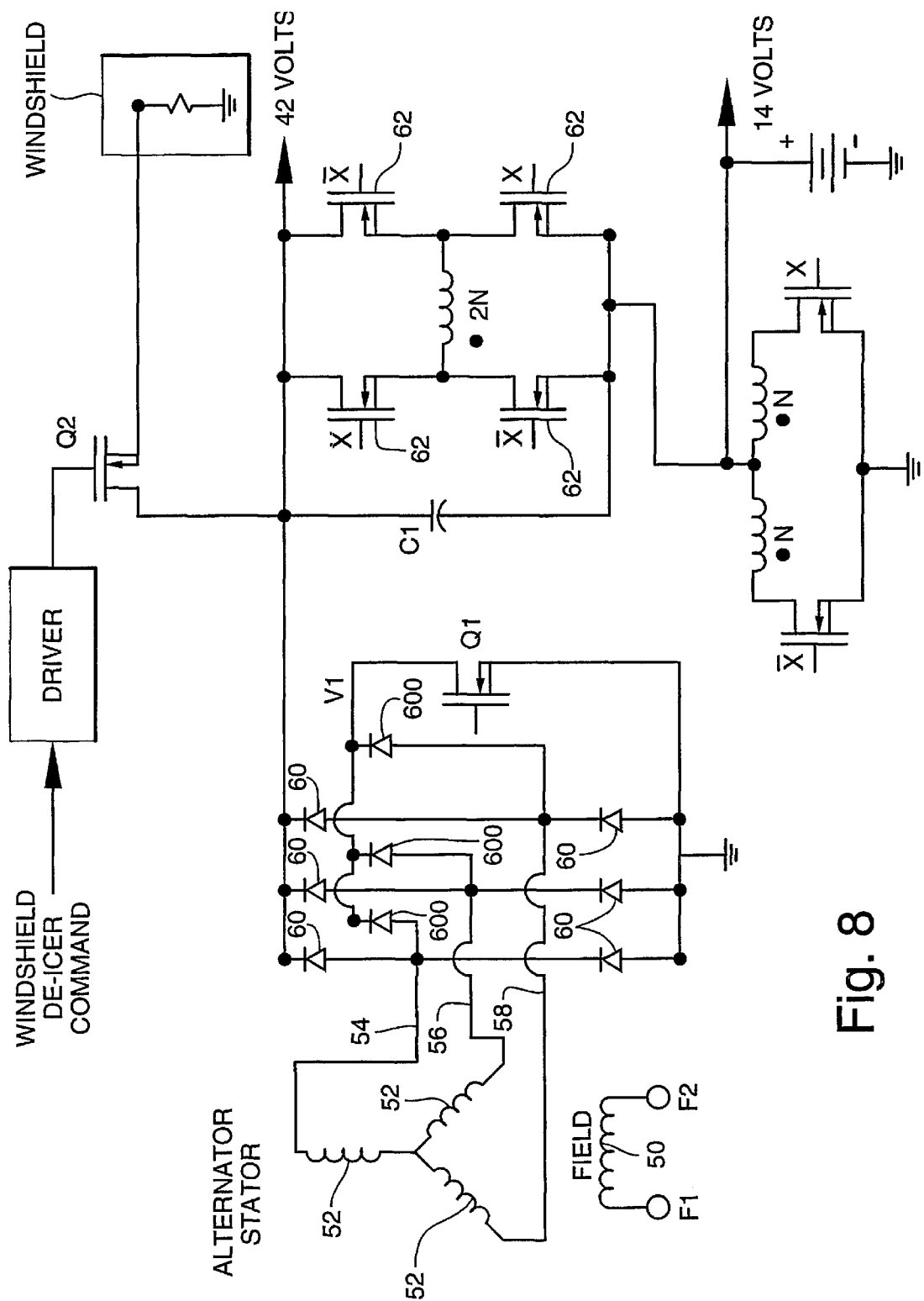
FIG. 8 is a schematic diagram of another embodiment of the shunt switching circuit configuration shown in FIG. 5.

Smaller, Lower Loss Shunt Switching Controller Implementation with Improved 42/14 Volt Converter Configuration Referring to FIG. 8, there is shown a functionally equivalent but smaller and lower loss embodiment of the boost mode switching regulator circuit shown in FIG. 5. It has been found that the intrinsic stator inductance internal to the alternator can effectively eliminate or minimize the need for a large external inductance. Thus, the alternate embodiment shown in FIG. 8 does not use the external inductance. Furthermore, a power diode triplet, formed by diodes 600, is added to the configuration and has the effect of eliminating diode D3 (shown in FIG. 5). The extra diode triplet (i.e. diodes 600) is shorted by transistor Q1 with isolation from the output obtained by the other diode triplet comprised of diodes 60. The power diode triplet 600 and it's common switching element to ground can be replaced by three separate switching elements driven in parallel and connected to ground. Either configuration effectively eliminates the forward losses in D1 thereby improving overall circuit efficiency. Any arrangement of components that can effectively and simultaneously short all three phases to ground is the desired function of the shunt switch mechanism. None of the control issues are changed by this improvement.

Referring to FIG. 8, there is shown a further embodiment of the alternator system of the present invention. This embodiment utilizes an alternate 42 volt-to-14 volt step-down converter configuration. This configuration differs from the configuration shown in FIGS. 1 and 5 in that the transformer and its associated primary and secondary electronics only has to handle ⅔ of the 14 volt output power. This is possible because the DC current flowing on the primary side (⅓ the output current), flows directly to the output and not to ground. The converter shown in FIG. 8 is relatively small in size since a minimum number of energy storage elements are required for filtering as a result of there being no variable power modulation in the inverter to regulate the 14-volt output. The 14-volt battery voltage is regulated via control of the field voltage in conjunction with the modulation on transistor Q1. The configuration illustrated in FIG. 8, as before, utilizes a center-tapped secondary and active rectifiers for improving efficiency on the 14-volt high current side of the transformer. The inverter operates at a much higher frequency than the basic alternator at idle and thus its magnetic structure coupled with its lower power allow it to be significantly smaller than the alternator's active magnetic volume. Operating at a few kilohertz and at ⅔ of an assumed 1.5 kW load, it would only weight a couple of pounds and be very efficient and compact. Even the energy loss in the secondary leakage voltage spikes is readily recoverable via simple catch diodes to the 42-volt side. The lower power (size) inverter configuration illustrated in FIG. 8 is also applicable to the converter configurations illustrated in FIG. 1 and FIG. 5. If the bilateral conversion characteristics of the converter are needed, as for example, to support an electronic valve system during engine run up to idle, the inverter would only have to convert ⅔ of the power needed because ⅓ essentially comes directly from the battery.

Application Examples and Scaling for the Enhanced Power Alternator System

The shunt regulator can be used in a power de-icing application as illustrated in FIGS. 5 and 8. Typically, the alternator at fast idle is designed to produce (at full field) both the maximum windshield power plus the maximum vehicle electric power with the average voltage V1 being the desired output voltage (e.g. 42 volts). At fast idle and above, modulation of transistor Q1 would not be required. When the system operates at speeds below fast idle, modulation of transistor Q1 would tend to occur to boost the output voltage from voltage V1. This "Q1 modulation" mode of operation, at speeds below fast idle, can occur when windshield de-icing is not activated.

Referring to FIGS. 5 and 8, in order to optimize operation at double the ordinary idle speed, the alternator stator is wound with:

(a) one-half (½) the number of turns as compared to the same alternator operating in the conventional constant voltage mode at 42 volts, and (b) with a wire having a cross sectional area that is twice that of the wire that is used in the same alternator operating in the conventional constant voltage mode.

This version of the enhanced performance boost mode alternator would exhibit "double power" at double speed with the same stator copper loses at twice the current (and output power) as the conventional 42 volt alternator would have at idle. A conventional alternator system optimized for maximum power at idle would only exhibit about a 40% increase in power at double idle with about 100% higher copper losses.

If the alternator is scaled to produce double power at double idle, the alternator will continue to create more output power as speed increases with the alternator power effectively increasing again by a factor of about 1.6 at very high speeds leading to about 3.2 times the output power achievable at normal idle. The increasing power capability is useful in electronic valve systems where output power requirements increase with speed. If a requirement of about 1.5 kW at idle is assumed, (3.2)×(1.5 kW)=4.8 kW total would be available at very high speeds. Re-scaling the same shunt ode alternator to one-third turn count vs. one-half turn count would still provide double power (3 kW) at double idle increasing to triple power (4.5 kW) at triple idle. At very high speeds, the limiting power would increase (1.6)×(4.5) kW=7.2 kW without affecting alternator size. This is sufficient for almost any high-speed electronic valve requirement. Again, this can be implemented with an alternator sized for only 1.5 kW at idle and would only require a standard belt and pulley assembly as the torque would never get higher than the torque required for the 1.5 kW at idle. Windshield de-icing power would normally never occur when the vehicle is operating at high engine speeds. Thus, potentially both electronic valve and electronic deicing systems could be utilized on the same vehicle with only a standard sized alternator.

The alternator windings for this latter 3× power system with 42 volt output have the same windings as a 1.5 kW alternator designed for 14 volts output. Furthermore, it would have the same current ratings at idle so bridge losses at idle would be the same and the same alternator could be used in this application if the bridge diodes can be rated for the 42 volt application.

The alternator system of the present invention provides a novel and cost efficient system that enables alternator power to increase proportionally with speed above a basic power capability at idle. The size of the alternator would be the same as a conventional alternator that is optionally designed for the same idle power. Incorporation of the power-enhancement circuitry and associated control circuitry described in the foregoing description provides significant advantages particularly when the system power requirement increases with frequency as required in electronically actuated valve systems.

The pulse-width modulation (PWM) circuits described in the foregoing description and shown in FIGS. 2, 3, 6, 6A, 7 and 7A are only representative of the class of switching modulators that can vary the duty cycle of transistor Q1 shown in FIGS. 1, 5 and 8. It is to be understood that other suitable circuitry or integrated circuits may be used to minimize overall component count, provide minimum pulse widths, reduce multiple switching sensitivity and minimize switching rates while controlling ripple amplitude. For example, hysteresis modulators may be used to implement some of these functions.

Figure 9:
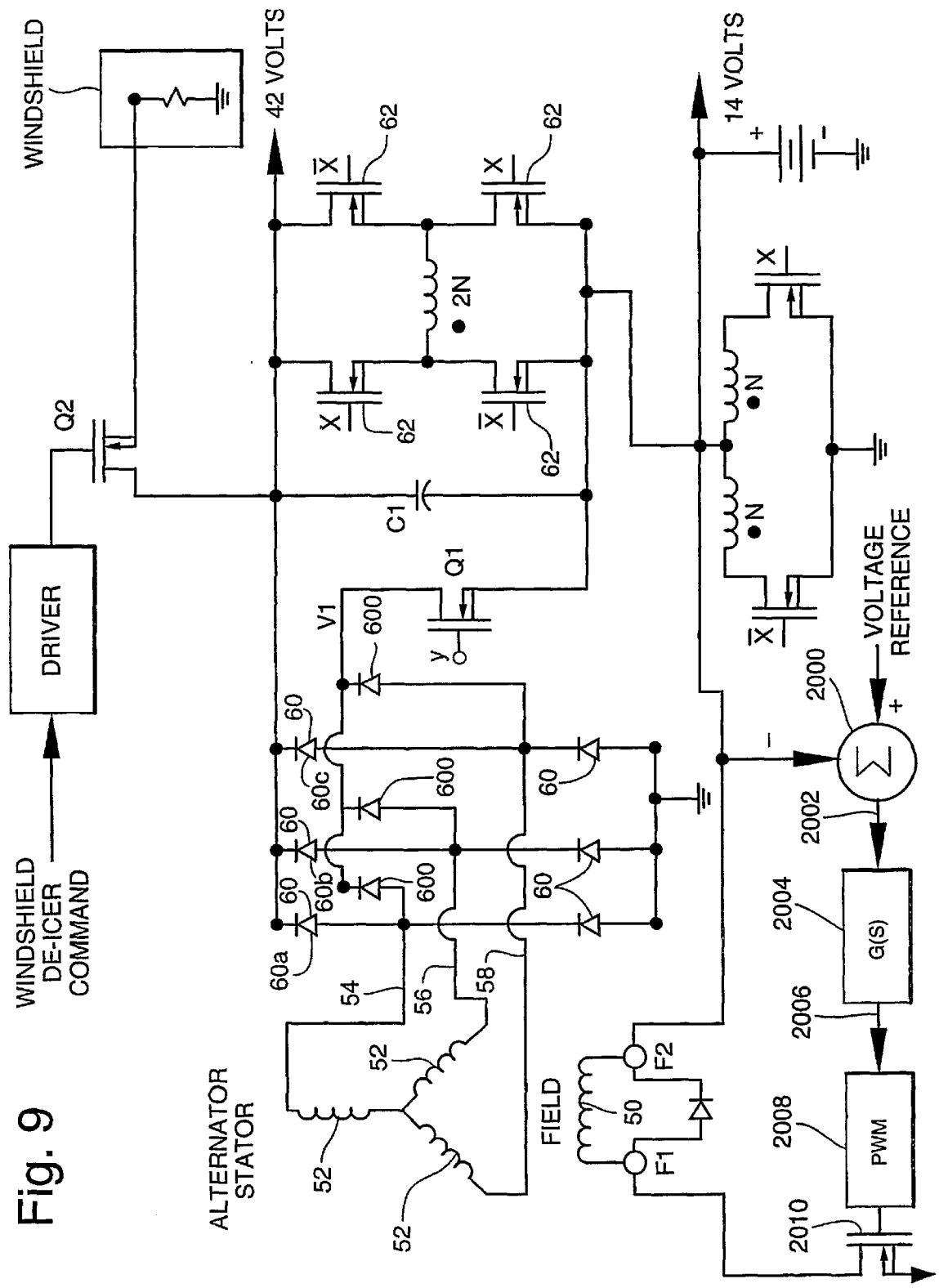
FIG. 9 is a block diagram of another embodiment of the invention that incorporates a semiconductor switch from an auxiliary alternator bridge output to the lower voltage terminal of a dual voltage system.

Referring to FIG. 9, there is shown a further embodiment of the alternator system of the present invention. This alternator system utilizes an alternate switch configuration that offers a significant performance improvement above idle speed while allowing simplified controls. In this configuration, transistor switch Q1 directly connects the auxiliary diode triplet common point to the 14 volts. In one embodiment of this configuration, transistor Q1 is turned "on" until the machine (i.e. alternator) speed reaches a fixed value and it is turned "off" above the speed. A modest amount of hysteresis is employed between the switch "on" and switch "off" frequency to avoid switch chatter. Systems for sensing alternator frequency and generating a voltage proportional to frequency (speed) have been discussed earlier in this patent. The hysteresis discussed above is easily implemented by operating on this speed-dependent voltage with a comparator configuration exhibiting positive feedback to control the hysteresis width. This hysteresis circuit is a well-known electronic technique. The polarity would be selected to provide the desired switch command. The alternator system is designed so that the alternator stator winding directly supplies the 14 volts at idle through the lower diode triplet. Transistor Q1 is turned "on" at low speeds up to about twice idle speed. When transistor Q1 is "on", field winding 50 is controlled as in a standard alternator. Specifically, a signal representing the desired voltage and a signal representing the measured output are inputted into network 2000. Network 2000 outputs difference signal 2001 that represents the difference between the desired voltage and the signal representing the measured output. Difference signal 2002 is amplified by gain circuit 2004. Gain circuit 2004 outputs an amplified gain signal 2006 which drives PWM circuit 2008. The PWM circuit 2008 drives transistor 2010. As a result, a variable duty cycle voltage is applied to the alternator's field winding 50 to close the loop.

Figure 9A:
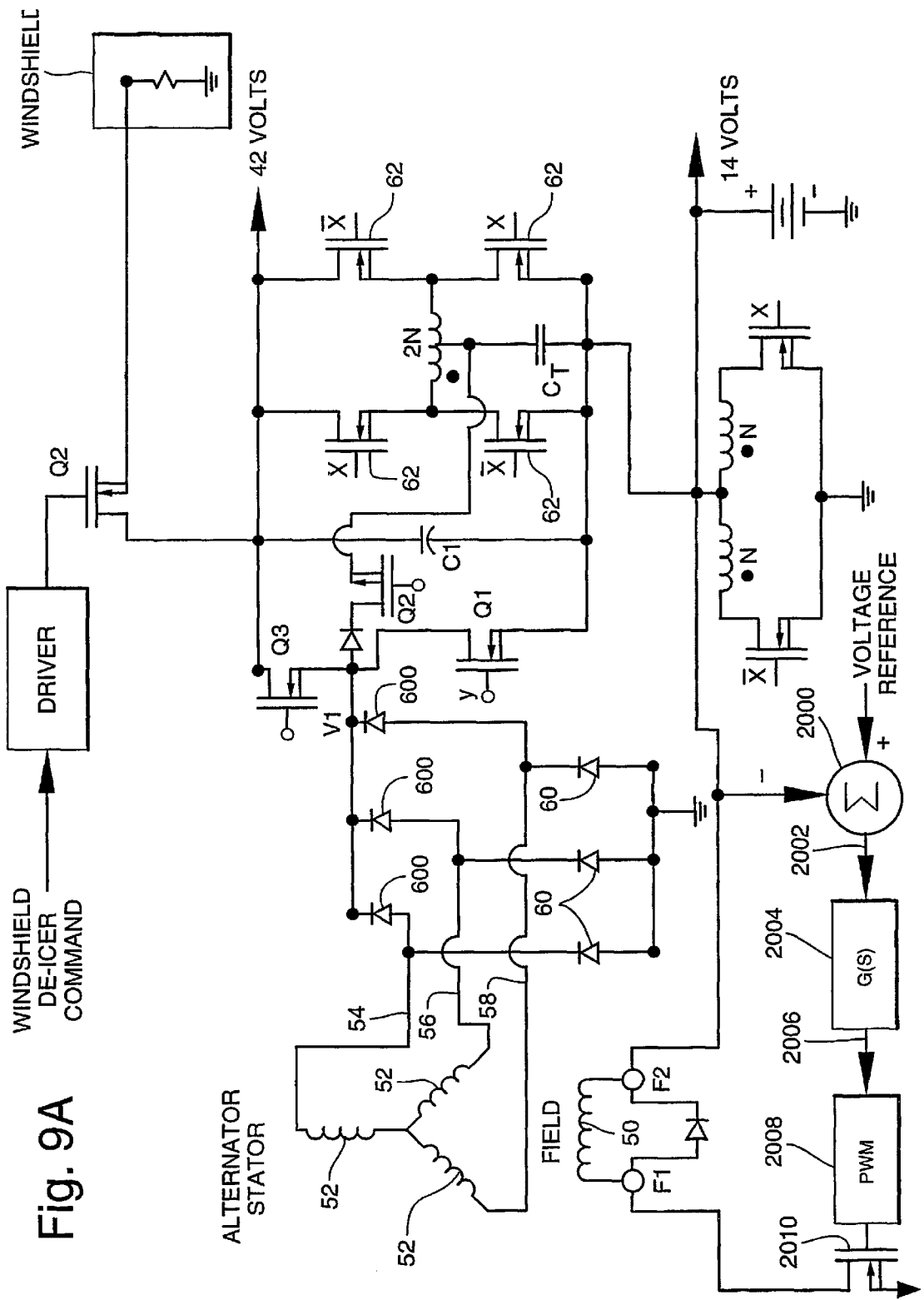
FIG. 9A is another embodiment of the system shown in FIG. 9.

As speed increases, the transistor Q1 current flowing into the 14-volts could further increase but is limited as previously discussed by inductance effects. As alternator speed increases, a point will be reached where the power achievable through transistor Q1 could be obtained by turning "off" transistor Q1 and letting the alternator power flow out the diodes 60*a*, 60*b* and 60*c* to supply 42 volts directly. Alternatively, diodes 60*a*, 60*b* and 60*c* can be eliminated by adding a semiconductor FET switch Q3 that is driven by the complement of the drive signal for transistor Q1 in the control configuration described in the foregoing discussion. The location of transistor Q3 is shown in FIG. 9A. This optimum switch point at maximum field flux would nominally occur at a nominally fixed frequency at about twice idle. If this switch point is selected correctly, the maximum power achievable is the same whether switch transistor Q1 is "on" or "off". As speed continues to increase, the machine is better matched to the 42 volt winding so output power connected to the power through transistor Q1 can substantially increase. In this dual (42-volt)-(14-volt) configuration, the maximum power achievable high speed when the transistor switch Q1 is "off" would be 3 times the maximum power available from the alternator if transistor Q1 remained "on". The voltage regulator configuration in this system remains the same whether or not power is flowing through transistor Q1. Operating the switch Q1 as a mode switching device rather than as a high speed power modulator minimizes the current ripple requirements on C1 thereby allowing the size of C1 to be reduced. The DC/DC converter function which contains no modulation also creates very little ripple current requirements on C1 so it can be small. The bilateral nature of the DC/DC converter means that 42 volts is available whenever the system is "on" independent of the alternator's speed. The operating voltage for transistor switch Q1 is also only (42−14)=28 volts so even with appropriate voltage margins, the FET technology employed would allow this switch to be very inexpensive while having the required high current capability.

To further optimize the performance of the system of FIG. 9, transistor Q1 could be modulated to optimize the power output obtainable from the alternator as the system progresses from idle to higher speeds. The control structure described above only switches transistor Q1 once and thus would be sub-optimum. As explained in the foregoing description, if the power is optimized at idle, through proper control, the alternator can increase its power proportional to speed.

The above sub-optimal system could generate the same power as the fully optimized system at idle speed. At above idle speeds and before switch-over occurs, the available power would be like the classical Lundell, going up by perhaps a factor of 1.4 at approximately double idle where nominal switch-over might occur. After switch-over and as speed further increases, the power capability would rapidly grow to three times the idle power at three times the idle speed. At this point, the alternator power would again begin to limit in the classical Lundell style as speed further increases. Overall at very high speeds, this system would provide three times the power the same machine can supply if the switch-over does not occur. This straightforward system with vastly improved power capability at high speeds may be adequate and cost effective for most systems including those with high power electronic valves. This system thus forms a preferred embodiment of the present invention.

The simple discrete system described above (containing 14 and 42 volts) can be extended to include a third discrete voltage. A center-tap on the 42-volt side of the DC/DC converter transformer is nominally at a potential of 28 volts. This voltage can be utilized as a third voltage to which the alternator DC output can be connected. A switch Q2 can be added to the configuration. This switch would be turned "on" when Q1 turns "off" to make an intermediate connection of the alternator bridge voltage to 28 volts. This switch would need to be able to support reverse voltage thus a blocking diode or alternate switch technology would be required (discussed in the ensuing description). As speed increases, both Q1 and Q2 would be turned "off" and Q3 would be turned "on" if diodes 60*a*, 60*b* and 60*c* (see FIG. 9) are eliminated. Alternatively, transistor Q3 can be eliminated if diodes 60*a*, 60*b* and 60*c* are re-reintroduced. This switching arrangement could be simply implemented by adding a second threshold sensor to the previously described output of the frequency-to-voltage converter. These two threshold sensor outputs and some simple logic can provide the signals to control switches Q1, Q2 and Q3. The first threshold sensor would change state at about 1.4 times the idle speed with the second threshold sensor changing state at about 2.2 times idle speed. The speeds are selected as before so that when the state is changed, the new output becomes capable of producing the same maximum power as the old output. The simple logic required would be to command Q1 "on" and Q2 and Q3 "off" from zero to 1.4 times the idle speed. Q1 would be "off", Q2 would be "on" and Q3 would be "off" from 1.4 times the idle speed to 2.2 times the idle speed. Only Q3 would be "on" at above 2.2 times the idle speed.

This discrete switching embodiment allows very close matching to the alternator's maximum capability with increasing speed. It is important to realize that this is possible without incorporating any high-frequency power modulation. The result is an alternator power capability that smoothly increases by a factor of three with the addition of only two semiconductor switches, namely Q1 and Q2.

Figure 10:
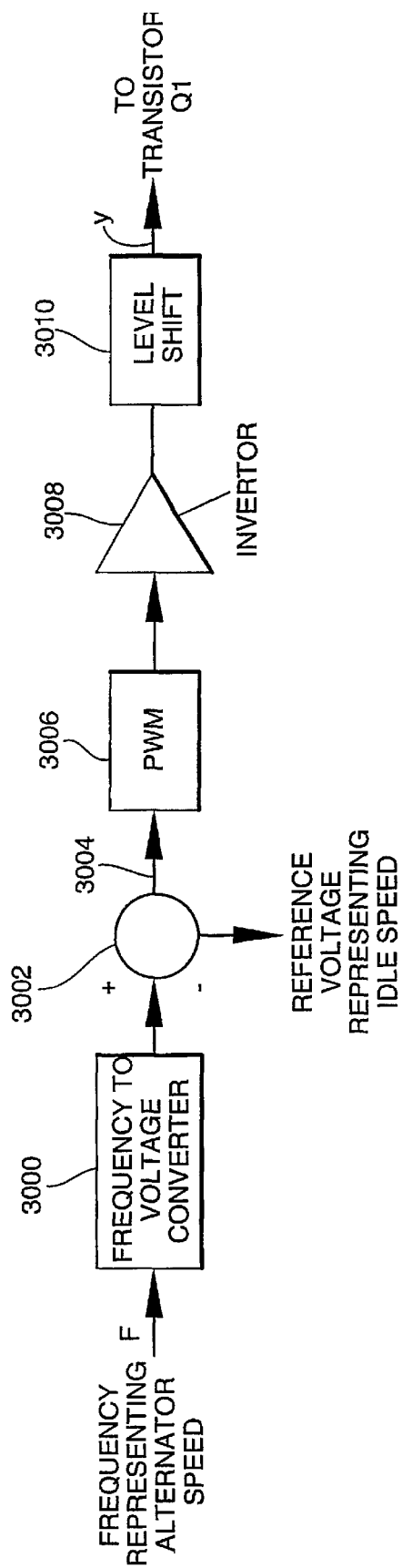
FIG. 10 is a block diagram illustrating a mechanism for controlling the power switch of FIG. 9.

For truly optimal power capability, we can apply techniques as discussed in the foregoing description. Referring to FIG. 9, and analogous to preceding discussions, it is desirable to apply a control function so that the V1 average voltage at maximum power increases linearly with speed. If the machine is optimized to provide maximum power to 14 volts at idle via a shorted transistor Q1, as speed increases further, transistor Q1 should be modulated so as to allow V1 to increase linearly with speed from 14 volts at idle to 42 volts at three times idle. If done in an open loop fashion, transistor Q1 would be modulated full "on" at idle (100% duty cycle) going to full "off" at three times idle (0% duty cycle). Techniques for generating this kind of "open" loop signal were described in the foregoing description relating to FIG. 3 and FIG. 7. FIG. 10 illustrates how this technique would apply in this situation. The voltage outputted by frequency-to-voltage converter 3000 is inputted into network 3002. Similarly, a fixed reference voltage representing idle frequency is also inputted into network 3002. Network 3002 subtracts the reference voltage form the voltage outputted by frequency-to-voltage converter 3000 and outputs difference signal 3004. When this difference signal 3004 goes positive, a linear voltage ramp would be created starting at the idle frequency. This ramp voltage would increase linearly with frequency and feed a pulse width modulator PWM circuit 3006. Scaling would be such that the PWM circuit 3006 would start increasing its duty cycle at idle speed and would reach 100% duty cycle at three times the idle speed. The output of PWM circuit 3006 would be inverted via inverter 3008 so the duty cycle would go to zero on the transistor Q1 drive when PWM circuit 3006 is at 100% duty cycle. The output of inverter 3008 is inputted into level shift circuit 3010 which outputs a signal, indicated by the letter Y, which drive transistor Q1 (see FIG. 9).

Extensions of the other control systems discussed previously can also be applied here. In particular, introducing a controlled current limit analogous to the technique discussed with regard to FIG. 6A would apply here wherein the transistor switch Q1 connects to 14 volts rather than ground. The current is transistor Q1, when "on", still represents a measurement of bridge current in the modified configuration. The fact that transistor Q1 is floating makes the transistor Q1 current limit command and current measurement command and transistor Q1 switch drive somewhat more complex. Use of a sense resistor for the bridge as previously discussed would simplify application in this floating configuration.

Figure 11:
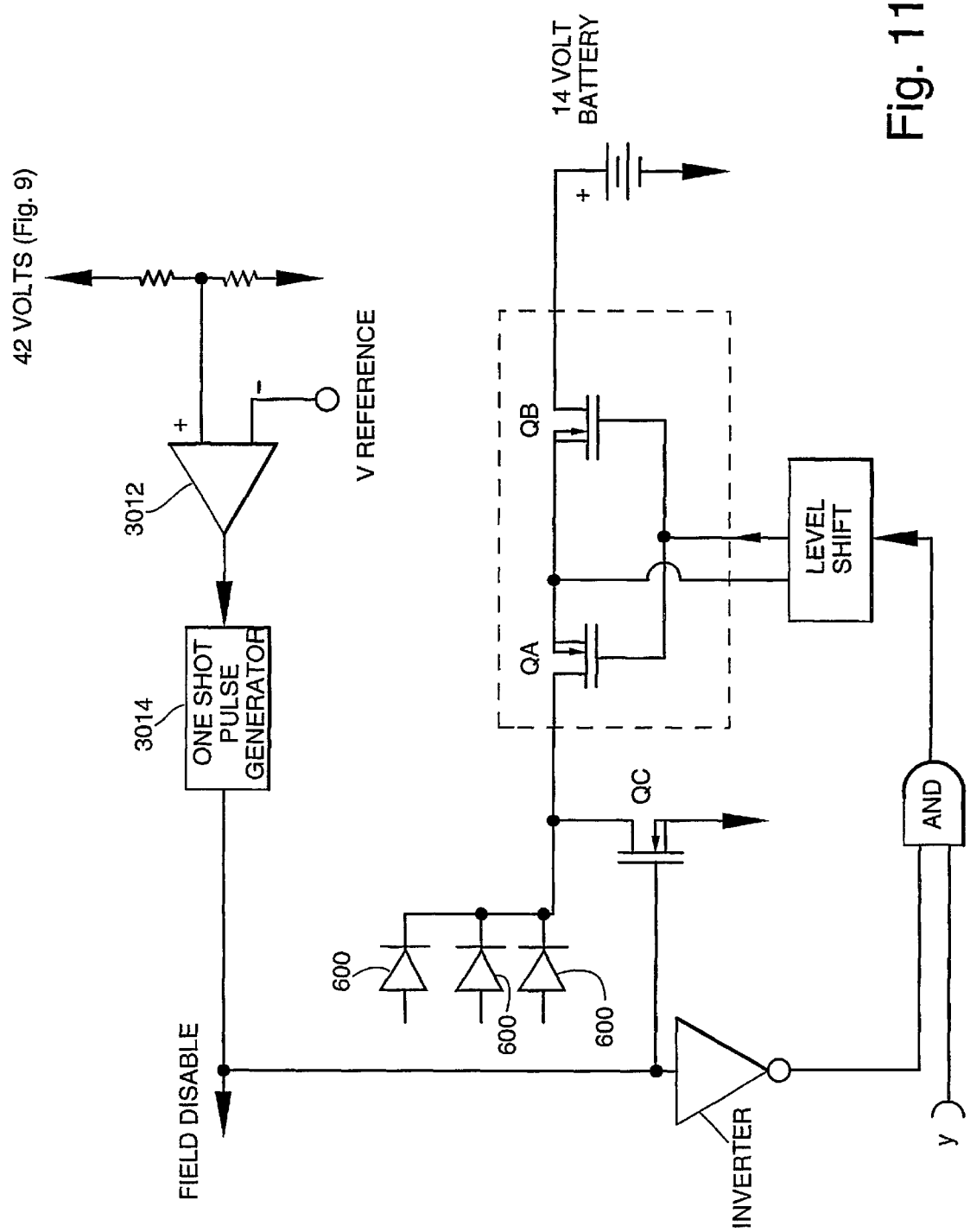
FIG. 11 is a block diagram illustrating an "over-voltage" protection circuit applicable to FIG. 9.

Over-voltage protection as previously discussed can also easily be added to this configuration by shorting the triplet voltage to ground. This cannot be done if the switch Q1 is a power FET because the device would conduct backward thus shorting out the battery. A FET device is the preferred component because of its high current capacity and low loss. A diode of course can be added in series with transistor Q1 pointing toward the 14 volts however it's losses may pose a problem. A SCR device can also block current in the reverse direction so it is also suitable as the transistor Q1 component although its losses are high relative to FET technology. If transistor Q1 of FIG. 9 is replaced by two back to back FET devices namely transistors QA and QB as illustrated in FIG. 11, transistor QB would be connected in reverse polarity so that it's forward direction of current would cause current flow out of the battery. However this reverse arrangement for FET QB allows it to support voltage when the triplet voltage is shorted to ground. FET QB never experiences a voltage greater than the battery voltage so it can be of lower voltage and higher current capacity for the same chip size as compared to transistor QA. Transistor QA would be identical to the transistor Q1 of FIG. 9. When the drive for the over-voltage protection transistor switch QC is turned "on", the equivalent transistor Q1 switched is turned "off". This is accomplished by inverting the over-voltage command and feeding an "AND" circuit that is driving Q1. The purpose of the "AND" function is to allow normal control of the equivalent transistor Q1 when an over voltage command is not present. An over-voltage sense and command circuit is also shown in FIG. 11. A signal representative of 42 volts is compared to a reference voltage representing the over voltage threshold via comparator 3012. When the measured 42 volts exceeds this threshold, a re-triggerable fixed pulse width is created by pulse generator 3014 which shorts out the alternator for a fixed interval to allow time for the alternator field to decay. This fixed width signal is also used to override the voltage regulator error signal so that the alternator field is commanded to zero. This override is necessary as the over-voltage on the small capacitor C1 may decay more rapidly than the field and thus its reflected value may cause the battery voltage to go below 14 volts. This would cause the regulator to command more field current when it is desired that the field current decay.

As an alternative to adding transistor QB, the crowbar function could be handled by adding an auxiliary set of triplet diodes to the phase outputs. Their common junction would connect to the top of a relocated transistor QC which when commanded "on" would short the machine windings to ground. Since the crowbar function only lasts on the order of 100 milli-seconds while the field decays, these parts would not be expensive. A third alternative for implementing the crowbar would add 3 power semiconductor switches (e.g. FET devices) each separately shorting an individual phase winding output to ground. These three power devices would have their inputs driven by the common crowbar command. These parts, although carrying high current, would only be "on" for the short 100 milli-second interval so they also could be relatively small. The latter configuration would also avoid the addition of transistor QB.

The power-enhancement scheme and associated circuit configurations described in the foregoing description can be used with any type of field-controlled alternator.

Although the control circuits described herein are presented in the context of analog and digital circuits or chips performing the particular control functions, it is to be understood that digital control techniques can be utilized to duplicate these control functions for relatively lower cost and less space.

While the present invention has been particularly described, in conjunction with several workable embodiments, it is evident that many other alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A system for enhancing the power output capability of a field controlled alternator having a field winding input and either a single phase or multi-phase alternator stator winding, the system comprising:

a power switching circuit including rectification circuitry for providing a full-wave rectified alternator output, inputs for receiving stator voltages, an input for receiving an operational state command, and a plurality of output voltage nodes, the power switching circuit being configured so that one operational state command effects connection of the alternator's full-wave rectified output to one of the output voltage nodes and electrically isolates said one of the output voltage nodes from the remaining output voltage nodes, and another operational state command effects connection of the alternator's full wave rectified output to another one of the output voltage nodes and electrically isolates said another one of the output voltage nodes from the remaining output voltage nodes;

an operational state command generator that includes circuitry for determining which operational state command to apply to the power switching circuit, the operational state command generator circuit effecting relatively more effective time in which the power switching circuit has operational states that are associated with relatively higher node voltages as the speed of the alternator increases thereby allowing the equivalent average rectified output of the alternator to increase with the speed of the alternator; and a voltage regulation circuit for providing a variable current to the field winding input of the alternator so as to maintain the magnitude of one of the node voltages.

2. The system according to claim 1 wherein the plurality of output voltage nodes comprises (n) output voltage nodes, and wherein the power switching circuitry includes (n−1) switching elements that enable the power switching circuit to transition from one operational state to another operational state.

3. The system according to claim 1 wherein one of the output voltage nodes is a zero voltage node.

4. The system according to claim 1 wherein the output voltage nodes are numerically designated and arranged in a progressive configuration according to the magnitudes of the node voltages.

5. The system according to claim 1 further comprising a plurality of system outputs, some of the system outputs being directly connected to some of the output voltage nodes and some of the system outputs being indirectly connected to the output voltage nodes though auxiliary components such as filters or DC-DC converters.

6. The system according to claim 1 further comprising a plurality of capacitive elements, at least some of the capacitive elements being connected between a pair of output voltage nodes.

7. The system according to claim 6 wherein at least some of the capacitive elements are connected between the output voltage nodes and circuit ground so as to filter the node voltages.

8. The system according to claim 5 wherein one or more of the system outputs are connected to a battery.

9. The system according to claim 5 further including a DC-DC converter having signal terminals connected to the output voltage nodes and other system outputs.

10. The system according to claim 5 wherein the voltage regulator circuit is configured to regulate a voltage that is associated with a system output.

11. The system according to claim 1 further comprising an inductor that is connected between the full-wave rectified output and the output voltage nodes.

12. The system according to claim 1 wherein the voltage regulation circuit is configured to limit a node voltage.

13. The system according to claim 1 wherein the operational state command generator is configured to provide operational state commands that enable the power switching circuit to consecutively and discretely transition to operational states that are associated with relatively higher node voltages when the speed of the alternator attains predetermined discrete speeds while the alternator speed is increasing.

14. The system according to claim 13 wherein the operational state command generating circuit includes circuitry for setting each predetermined discrete alternator speed at which an operational state transition occurs while the alternator speed is accelerating to an alternator speed that corresponds to a maximum regulatable load wherein an operational state transition to a next relatively higher operational state results in generally the same maximum regulated output capability in said next relatively higher operational state.

15. The system according to claim 14 wherein the operational state command generator is configured to provide operational state commands that enable the power switching circuit to consecutively and discretely transition to operational states that are associated with relatively lower node voltages when the speed of the alternator attains different discrete speeds while the alternator speed is decreasing and said different discrete speeds are relatively less than said predetermined discrete speeds, and wherein said different discrete speeds are chosen so as to substantially eliminate mode chatter as the power switching circuit transitions from one operational state to another operational state.

16. The system according to claim 1 wherein the operational state generating circuit includes pulse width modulating circuitry that is responsive to alternator speed, the pulse width modulating circuitry that effects transitioning of the power switching circuit from one operational state to another operation state, the pulse width modulating circuitry having a duty cycle and an input for receiving a signal that represents instantaneous alternator speed, the pulse width modulating circuitry being configured so that the duty cycle increases as the alternator speed increases and decreases as the alternator speed decreases.

17. The system according to claim 16 wherein the pulse width modulating circuitry is configured so that the duty cycle varies proportionately from 0% to 100% as the alternator speed changes from first speed to a second speed wherein the ratio of the second speed to the first speed is generally the same as the ratio of a node voltage corresponding to a first operational state to a second relatively lower node voltage corresponding a second operational state.

18. The system according to claim 1 wherein the voltage regulating circuit comprises a closed loop control circuit that further effects regulation of and is responsive to one of the output voltage nodes, the closed loop control circuit varying the duty cycle of the particular pulse with modulating circuitry output signal that causes the power switching circuitry to operate between operational states such that the node voltage is controlled.

19. The system according to claim 18 further wherein the closed loop circuit includes circuitry for varying the alternator field current in order to regulate the other node voltage associated with said another one of the plurality of output voltage nodes.

20. The system according to claim 19 wherein in a first one of the operational states, one of the output voltage nodes provides zero volts and in a second one of the operational states, one of the output voltage nodes provides a primary voltage, the power switching circuit being configured to effectively short out all alternator windings while electrically isolating the other output voltage nodes.

21. The system according to claim 16 further comprising overload power maximization circuitry that comprises:

circuitry for measuring DC bridge current;

circuitry for receiving a reference signal representing optimum power and generating a error signal that represents the difference between the DC bridge current and the reference signal;

means for inputting the error signal into the pulse width modulating circuitry, the error signal increasing the duty cycle of the pulse width modulating circuit so as to increase the time in which the full-wave rectified output is connected to the output voltage nodes that are associated with a relatively higher node voltages.

22. A system for enhancing the power output capability of a field controlled alternator having a field winding input and either a single phase or multi-phase alternator stator winding, the circuitry comprising:

a full-wave rectifier circuit including a DC bridge circuit for receiving an AC voltage from the alternator and providing a full-wave rectified output voltage;

a closed-loop pulse width modulated switching regulator circuit which steps down the full wave rectified output voltage to provide a relatively lower regulated DC output voltage; and a field winding control circuit for limiting the full-wave rectified output voltage to a predetermined magnitude and to effect reduction in filed current during relatively light alternator loading situations.

23. The system according to claim 22 further comprising overload power maximization circuitry that comprises:

circuitry for measuring DC bridge current;

circuitry for receiving a reference signal representing optimum power and generating a error signal that represents the difference between the DC bridge current and the reference signal;

means for inputting the error signal into the pulse width modulating circuitry, the error signal effecting a decrease in the duty cycle of the pulse width modulating circuit so as to effectively limit the DC bridge current and maximize alternator power capability.

24. The system according to claim 22 further comprising overload power maximization circuitry that comprises:
- circuitry for measuring alternator speed;
- circuitry for measuring DC bridge voltage;
- circuitry for generating a error signal that represents the difference between the signal representing DC bridge voltage and the signal representing alternator speed;
- means for inputting the error signal into the pulse width modulating circuitry, the error signal effecting a decrease in the duty cycle of the pulse width modulating circuit so as to effectively limit the DC bridge current and maximize alternator power capability.

* * * * *

UNITED STATES PATENT AND TRADEMARK OFFICE
CERTIFICATE OF CORRECTION

PATENT NO. : 6,545,884 B2  
DATED : April 8, 2003  
INVENTOR(S) : William P. Curtiss It is certified that error appears in the above-identified patent and that said Letters Patent is hereby corrected as shown below:

<u>Column 22,</u>  
Line 1, insert -- a -- before "first".  
Line 14, delete "further".  
Line 54, delete "filed" and replace with -- field --.

Signed and Sealed this

Third Day of February, 2004

JON W. DUDAS  
*Acting Director of the United States Patent and Trademark Office*